United States Patent
Dong et al.

(10) Patent No.: US 12,285,743 B2
(45) Date of Patent: Apr. 29, 2025

(54) SUPPORTED CATALYST, PREPARATION METHOD THEREFOR AND APPLICATION THEREOF

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Songtao Dong, Beijing (CN); Zhihai Hu, Beijing (CN); Guangle Zhao, Beijing (CN); Ping Yang, Beijing (CN); Yang Zhao, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

(*) Notice: Subject to any disclaimer, the term of this patent is extended or adjusted under 35 U.S.C. 154(b) by 140 days.

(21) Appl. No.: 17/755,555

(22) PCT Filed: Oct. 29, 2020

(86) PCT No.: PCT/CN2020/124801
§ 371 (c)(1),
(2) Date: May 2, 2022

(87) PCT Pub. No.: WO2021/083270
PCT Pub. Date: May 6, 2021

(65) Prior Publication Data
US 2022/0266224 A1   Aug. 25, 2022

(30) Foreign Application Priority Data

Oct. 31, 2019 (CN) .......................... 201911053683.6
Oct. 31, 2019 (CN) .......................... 201911055026.5

(51) Int. Cl.
| | |
|---|---|
| *B01J 35/50* | (2024.01) |
| *B01J 23/75* | (2006.01) |
| *B01J 23/78* | (2006.01) |
| *B01J 29/08* | (2006.01) |
| *B01J 35/63* | (2024.01) |
| *B01J 37/02* | (2006.01) |
| *B01J 37/08* | (2006.01) |
| *C10G 2/00* | (2006.01) |
| *C10G 47/20* | (2006.01) |

(52) U.S. Cl.
CPC .............. *B01J 23/75* (2013.01); *B01J 23/78* (2013.01); *B01J 29/08* (2013.01); *B01J 35/638* (2024.01); *B01J 37/0207* (2013.01); *B01J 37/08* (2013.01); *C10G 2/50* (2013.01); *C10G 47/20* (2013.01); *C10G 2300/1022* (2013.01)

(58) Field of Classification Search
None
See application file for complete search history.

(56) References Cited

U.S. PATENT DOCUMENTS

| | | | | |
|---|---|---|---|---|
| 3,755,204 | A | * | 8/1973 | Sergeys ................. B01J 23/868 502/527.22 |
| 3,963,504 | A | * | 6/1976 | Lundsager ............. B01D 53/86 264/43 |
| 5,763,352 | A | * | 6/1998 | Jung ........................ B01J 38/00 502/305 |
| 2001/0011149 | A1 | | 8/2001 | Meibner et al. |
| 2011/0201494 | A1 | | 8/2011 | Birdsall et al. |
| 2015/0306581 | A1 | | 10/2015 | Zhang et al. |
| 2016/0310932 | A1 | | 10/2016 | Fukasawa |
| 2019/0126261 | A1 | | 5/2019 | Richard |

FOREIGN PATENT DOCUMENTS

| | | | |
|---|---|---|---|
| CN | 1344781 | A | 4/2002 |
| CN | 1115388 | C | 7/2003 |
| CN | 1859975 | A | 11/2006 |
| CN | 101134173 | A | 3/2008 |
| CN | 101415491 | * | 4/2009 |
| CN | 101967064 | A | 2/2011 |

(Continued)

OTHER PUBLICATIONS

Ma, Zhijun et al.; "Study of Protein. concrete Foaming Agent"; Building Science; vol. 25, No. 5; May 2009, pp. 73-76.

(Continued)

*Primary Examiner* — Sheng H Davis
(74) *Attorney, Agent, or Firm* — NKL Law; Allen Xue

(57) ABSTRACT

A supported catalyst has a support and a metal active component disposed on the support. The metal active component is at least one selected from the group consisting of a Group VIB metal element and a Group VIII metal element. The support contains at least one of heat-resistant inorganic oxides and molecular sieves and includes an internal channel penetrating the support. The ratio of the cross-section area of the channel to the cross-section area of the support is 0.05-3:100. The difference R between the water absorption rate and the BET pore volume of the support is not less than 0.2 mL/g. The supported catalyst can be used as a hydrogenation catalyst. When used in the hydrocracking of hydrocarbon oils, it can achieve high catalytic activity and high yield of jet fuels at the same time. The supported catalyst can also be used as a Fischer-Tropsch synthesis catalyst.

24 Claims, 7 Drawing Sheets

(56) References Cited

FOREIGN PATENT DOCUMENTS

| | | | |
|---|---|---|---|
| CN | 101890382 B | | 8/2012 |
| CN | 103269798 A | | 8/2013 |
| CN | 104736241 | * | 6/2015 |
| CN | 103418441 B | | 8/2015 |
| CN | 105233880 A | | 1/2016 |
| CN | 205587001 U | | 9/2016 |
| CN | 107519890 | * | 12/2017 |
| CN | 107715907 A | | 2/2018 |
| CN | 108786928 A | | 11/2018 |
| FR | 0002931834 B1 | | 7/2010 |
| JP | 2003334457 | * | 11/2003 |
| JP | 2007500596 A | | 1/2007 |
| JP | 2013511383 A | | 4/2013 |
| JP | 2014508028 A | | 4/2014 |
| JP | 2017518171 A | | 7/2017 |
| KR | 20030081858 | * | 10/2003 |
| RU | 2140966 C1 | | 11/1999 |
| RU | 2322293 C2 | | 4/2008 |
| WO | 0068549 | * | 11/2000 |
| WO | 2012091898 A2 | | 7/2012 |
| WO | 2013045990 | * | 4/2013 |
| WO | WO-2013045990 A1 | * | 4/2013 ............ F01N 13/02 |
| WO | 2019170406 A1 | | 9/2019 |
| WO | 2019170514 A1 | | 9/2019 |

OTHER PUBLICATIONS

Liu, Xiyao et al.; "Industrial Catalyst Analysis, Testing and Characterization"; China Petrochemical Press, Beijing, Apr. 1990; pp. 29.

* cited by examiner

SUPPORTED CATALYST, PREPARATION METHOD THEREFOR AND APPLICATION THEREOF

TECHNICAL FIELD

The present disclosure relates to supported catalysts. In particular, the present disclosure relates to a supported catalyst with an internal channel axially penetrating the support, which shows both high strength and high catalytic activity, and a preparation method and application thereof.

BACKGROUND

Increasing environmental awareness and stricter environmental regulations have forced the oil refining industry to pay more attention to the development of clean fuel production technologies. In the future, vehicle fuels in the market tend to be "ultra-low sulfur", and thereby fuels that cannot meet emission standards will not be able to enter the market. As an effective desulfurization method, hydrogenation technology plays an increasingly important role in the production of clean vehicle fuels. Among others, high-efficiency hydrogenation catalysts are the key of hydrogenation technologies. Therefore, the development of a new type of hydrocracking catalyst with higher activity and selectivity has become one of the most urgent demands in the oil refining industry.

Fischer-Tropsch synthesis process, also known as FT synthesis, is a process in which synthesis gas (a mixed gas of carbon monoxide and hydrogen) is used as a raw material to synthesize liquid hydrocarbons or hydrocarbons in presence of a catalyst under appropriate conditions. It is a key step in the indirect conversion of non-oil based resources such as coal, natural gas and biomass into high-grade liquid fuels and chemical raw materials.

Hydrocracking catalysts and Fischer-Tropsch synthesis catalysts are usually prepared by impregnation methods. That is, the support is impregnated with a solution containing the required active components (such as Ni, Mo, Co, W, and the like), and then dried and may or may not be calcined. Active components and supports are important components of supported catalysts. The active component is supported on the surface of the support. The support is mainly used to support the active component, so as to impart the catalysts with specific physical properties. The support per se generally does not have catalytic activity. However, the support has many effects on the performances of the supported catalysts. For example, it may affect the reaction performance of the catalysts and the distribution of products. For example, when the shape of the support used is different, the performance of the Fischer-Tropsch synthesis catalysts may vary substantially. Because Fischer-Tropsch synthesis is a reaction suffered from serious problems in diffusion and mass transfer, to make the support have a large macroscopic external surface area and a short macroscopic diffusion distance may be advantageous to increase the Fischer-Tropsch synthesis reaction activity and reduce the selectivity to methane.

As to identifying geometric shape and size of an industrial catalyst, it often needs to balance in multiple aspects while taking into account multiple characteristics of the catalyst. In order to achieve different subjects, many shapes of catalysts have been developed already. The commonly used shapes are spheres, which are often used for fluidized catalysts or for catalysts that have special requirements on the fluidity thereof. There are also strips, which are used for fixed-bed catalysts. On the basis of strips, it has been further expanded into cylinder strips, three-lobe strips, four-lobe strips, other multi-lobe strips and deformed multi-lobe strips. There are also barrel-shaped strips, i.e., strips with holes in the cylinder, such as typical Raschig rings, cross rings, Pall rings, and step rings. There is also a honeycomb support, i.e., cordierite or alumina matrix with uniformly distributed channels therein, which is often used in SCR and the treatment of automobile exhaust, and the like.

Some methods have been disclosed in the prior art for improving the diffusion performance of catalysts. CN1859975A discloses a deformed trilobal strip catalyst. CN101134173A proposes a support and a catalyst with a special shape which is an ellipsoid, wherein one or more grooves are opened on the ellipsoid. It is said that due to its larger external surface area and good mass transfer performance, the catalyst can be widely used in, for example, heavy oil processing reactions. CN103269798A proposes a shaped catalyst body which has a base surface, a cylinder surface, a cylinder axis and at least one completely penetrating cylinder opening running parallel to the cylinder axis, wherein the base surface of the cylinder has at least four corners. It is used as a support with low surface area. CN105233880A discloses a belly core Clover-shaped catalyst support, a preparation method therefor and application thereof. The support is composed of two layers, wherein the outer shell is made of porous structure materials, and the inner core is made of dense structure materials, and wherein the inner core has a specific surface area of less than 1 $m^2/g$. The catalyst has high crushing strength, and shows low diffusion impact when used in Fischer-Tropsch synthesis catalysts.

With respect to the utilization rate of catalyst and active metal, catalysts with channels in the middle, such as Raschig ring or cross rings, have the highest activity utilization rate, followed by honeycomb supports, then strip supports, and then spherical supports. However, the order of the strength of those catalysts is just reversed. In order to balance between catalyst utilization and strength, generally used are hollow supports or catalysts with morphologies like Raschig rings and honeycomb supports. In such cases, ceramics and the like are often used as the matrix. Due to the fact that the matrix per se has high strength, even if voids are left in the middle, the overall strength is still high. For the supports or catalyst materials whose matrix is not strong enough, a spherical shape or a strip shape is considered, to avoid sharp deterioration of the overall strength caused by voids in the middle, and even collapse of the support. In the case of strip morphology, it has been proposed to increase the tortuosity of the outer interface of the strip to increase the contact surface with the outside, so as to further improve the activity efficiency of the catalyst while maintaining minimal change in strength.

In addition, in order to improve the diffusion performance of catalysts, also proposed is a method of increasing the amount of macropores or ultra macropores by adding a shaping aid. CN103418441B discloses a hydrorefining catalyst, whose support is a shaped product containing carbon, cellulose ether and hydrated alumina. The disclosed hydrorefining catalyst not only has excellent performance in hydrorefining hydrocarbon oils, but also requires a simple preparation method and low production cost. CN1115388C proposes a hydrogenation protective agent and a preparation method therefor. It uses carbon black or organic pore expander as a pore expander. It is said to achieve higher catalyst activity, lower carbon deposit, better activity stability and higher strength. CN101890382B proposes a method for preparing a catalyst which includes rod-shaped nano oxides in addition to alumina materials. The catalyst prepared by the disclosed method has large pore volume, large pore size and good pore penetration, which is especially suitable for hydrogenation of residual oils in a fixed bed.

As mentioned above, the methods for improving diffusion disclosed in the prior art include introducing channels in the support, using modifiers to optimize pores and increasing the contact area through special shapes. The method of introducing channels is generally suitable for those where the matrix per se has high strength or the support has small specific surface area, but not for those where the matrix per se has low strength or the support has large specific surface area. The method of using modifiers to optimize pores is mainly based on forming pores via fillers. By adding aids or using precursors of hydrated alumina with different properties, the pores are optimized by improving the connection between the basic units. Such methods are characterized in that a large amount of additives are required, and the pores obtained generally have smaller pore size.

It can be seen from the above that the catalysts and supports in the prior art still have many defects. There is a demand for a catalyst that shows both high strength and high catalytic activity.

SUMMARY OF THE INVENTION

The present disclosure is to solve above-mentioned defects in the prior art by providing a supported catalyst and its preparation method and application. The supported catalyst of the present disclosure can be used as a hydrogenation catalyst. When used in the hydrocracking of hydrocarbon oils, it can achieve high catalytic activity and high yield of jet fuels at the same time. The supported catalyst of the present disclosure can also be used as a Fischer-Tropsch synthesis catalyst. When used in Fischer-Tropsch synthesis, the catalyst shows advantages of high strength and high activity efficiency.

In order to achieve the above subjects, the first aspect of the present disclosure provides a supported catalyst, comprising a support and a metal active component supported on the support,
  wherein the metal active component is at least one selected from the group consisting of Group VIB metal elements and Group VIII metal elements;
  wherein the support contains at least one of heat-resistant inorganic oxides and molecular sieves;
  wherein the support includes an internal channel penetrating the support, wherein the ratio of the cross-section area of the channel to the cross-section area of the support is 0.05-3:100; and
  wherein the difference R between the water absorption rate and the BET pore volume of the support is not less than 0.2 mL/g.

The second aspect of the present disclosure provides a method for preparing the above-mentioned supported catalyst, comprising the steps of:
  (I) mixing precursors of the support, water, optionally a foaming agent, optionally an extrusion aid, and optionally a binder, to obtain a mixture;
  (II) shaping the mixture to obtain a shaped product with an internal channel penetrating the shaped product;
  (III) subjecting the shaped product obtained in step (II) to the first calcining to obtain the support;
  (IV) impregnating the support obtained in step (III) with a solution containing precursors of the metal active component, and then subjecting to drying and the second calcining.

The third aspect of the present disclosure provides a use of the above-mentioned supported catalyst in hydrocracking.

The fourth aspect of the present disclosure provides a hydrocracking method, comprising the step of: contacting a hydrocarbon oil with a hydrocracking catalyst under hydrocracking conditions, wherein the hydrocracking catalyst is the supported catalyst of the present disclosure.

The fifth aspect of the present disclosure provides a use of the above-mentioned supported catalyst in a Fischer-Tropsch synthesis reaction.

The sixth aspect of the present disclosure provides a Fischer-Tropsch synthesis method, comprising the steps of: contacting CO and $H_2$ with the supported catalyst of the present disclosure under the conditions for Fischer-Tropsch synthesis reaction.

The present disclosure can be embodied as the following items.

1. A hydrogenation catalyst comprising a support and a Group VIB metal element and a Group VIII metal element supported on the support,
  wherein the support contains at least one of a heat-resistant inorganic oxide and a molecular sieve; the support includes an internal channel penetrating the support; the ratio of the cross-section area of the channel to the cross-section area of the support is 0.05-30:100; and the difference R between the water absorption rate and the BET pore volume of the support is not less than 0.2 mL/g.

2. The catalyst of item 1, wherein, based on the total amount of the catalyst, the Group VIB metal element is present in an amount of 10-35 wt %, and the Group VIII metal element is present in an amount of 2-15 wt %, and the support is present in an amount of 50-88 wt %, all on oxides basis.

3. The catalyst of item 1, wherein the Group VIB metal element is Mo and/or W, and the Group VIII metal element is Co and/or Ni;
  preferably, the heat-resistant inorganic oxide is at least one selected from the group consisting of alumina, silica, titania, magnesium oxide, zirconia, thorium oxide and beryllium oxide, preferably at least one of alumina, silica, titania and zirconia; preferably, based on the total amount of the support, the heat-resistant inorganic oxide is present in an amount of 1-99 wt %, and the molecular sieve is present in an amount of 1-99 wt %.

4. The catalyst of any one of items 1 to 3, wherein the ratio of the cross-section area of the channel to the cross-section area of the support is 0.1-20:100, preferably 0.2-10:100;
  preferably, the difference R between the water absorption rate and the BET pore volume of the support is 0.2-0.8 mL/g, more preferably 0.2-0.5 mL/g;
  preferably, the difference R between the water absorption rate and the BET pore volume of the support comprises 10-50%, preferably 15-35% of the water absorption rate of the support.

5. The catalyst of any one of items 1 to 4, wherein:
  the support is in the shape of spheres and/or strips, preferably strips, and more preferably multi-lobe strips;
  preferably, the support has an equivalent diameter of not more than 5 mm, preferably not more than 3 mm, more preferably not more than 2 mm, and even more preferably 0.8-2 mm;

preferably, the channel is a passage of an uniform cross-section, and further preferably, the channel is in the shape of a cylinder and/or a regular polygonal prism; further preferably, the diameter of the cylinder and the diameter of the circumscribed circle of the regular polygonal prism are independently not less than 5 μm, preferably 0.01-0.5 mm, more preferably 0.05-0.3 mm.

6. The catalyst of any one of items 1 to 5, wherein the support has a radial crushing strength of 14-30 N/mm, preferably 18-26 N/mm; preferably, the catalyst has a bulk density of 0.5-1 g/mL, more preferably 0.6-0.9 g/mL.

7. The catalyst of any one of items 1-6, wherein the number of the channel is 1-10, preferably 1-6;
   preferably, the cross-section of the support is a circle, and the channels extend along the central axis of the circle and/or are circumferentially arranged at equal intervals along the central axis;
   preferably, the cross-section of the support is in a multi-lobe shape, the channels extend along the central axis of the circumscribed circle of the multi-lobe shape and/or extend along the central axis of the circumscribed circle of each lobe of the multi-lobe shape.

8. The catalyst of any one of items 1-7, wherein the support is prepared by a method which comprises the steps of:
   (I) mixing precursors of the support, a foaming agent, water, optionally an extrusion aid, and optionally a binder, to obtain a mixture;
   (II) shaping the mixture to obtain a shaped product with an internal channel penetrating the shaped product;
   (III) subjecting the shaped product obtained in step (II) to calcining.

9. The catalyst of item 8, wherein the foaming agent is an animal protein based foaming agent and/or a plant based foaming agent, preferably an animal protein based foaming agent;
   preferably, the animal protein based foaming agent is at least one selected from the group consisting of an animal hoof based foaming agent, an animal hair based foaming agent and an animal blood gel based foaming agent;
   preferably, relative to 100 g of precursors of the support on a dry basis, the foaming agent is present in an amount of 0.1-50 mL, preferably 0.5-20 mL.

10. The catalyst of item 8, wherein the extrusion aid is at least one selected from the group consisting of sesban powder, cellulose and derivatives thereof, starch and derivatives thereof, ethylene glycol and diethylene glycol;
   the binder is at least one selected from the group consisting of hydroxymethyl cellulose, an inorganic acid, starch and derivatives thereof, silica sol or aluminum sol;
   relative to 100 g of the precursors of the support on a dry basis, the extrusion aid is present in an amount of 0.1-6 g; and relative to 100 g of the precursors of the support on a dry basis, the binder is present in an amount of 0.1-10 g.

11. The catalyst of item 8, wherein the mixing of step (I) comprises: mixing the precursors of the support and the extrusion aid, and then adding the foaming agent, the binder and water to obtain the mixture; preferably, the calcining in step (II) is operated at a temperature of 350-700° C., preferably 450-650° C.; for a time of 1-10 hours, preferably 2-6 hours.

12. The catalyst of item 8, wherein the shaping of step (II) is operated in an extruder, wherein the extruder includes a main body and an orifice plate, and the main body is configured to allow the mixture pass through the orifice plate to be shaped;
   the orifice plate includes a base (1) with a shaping hole (2), a bracket (3) with at least one feed hole (6), and at least one shaping rod (4); wherein the bracket (3) is arranged over the base (1), and the shaping hole (2) is communicated with the feed hole (6), and wherein the bracket (3) is further provided with at least one mounting hole (5) allowing the shaping rod (4) pass through, and the shaping rod (4) is arranged to penetrate the shaping hole (2).

13. The catalyst of item 8, wherein the ratio of the cross-section area of the shaping rod (4) to the cross-section area of the shaping hole (2) in the orifice plate is 0.05-30:100, preferably 0.1-20:100, more preferably 0.2-10:100;
   preferably, the shaping hole (2) has an equivalent diameter of not greater than 5 mm, preferably not greater than 3 mm, more preferably not greater than 2 mm, and even more preferably 0.8-2 mm;
   preferably, the shaping hole (2) has a cross-section of circle, oval or multi-lobe shape; preferably, the multi-lobe shape is three-lobe, four-lobe or five-lobe; preferably, the number of the shaping rod (4) is 1-10, preferably 1-6; preferably, the shaping hole (2) has a cross-section of multi-lobe shape, and the shaping rods (4) extend along the central axis of the circumscribed circle of the multi-lobe shape and/or extend along the central axis of each lobe of the multi-lobe shape; preferably, the number of the mounting hole (5) is equal to the number of the shaping rod (4); preferably, the shaping rod (4) is detachably connected with the bracket (3) through the mounting hole (5).

14. The catalyst of item 13, wherein the number of the feed holes (6) is 1-20, preferably 2-20;
   preferably, a plurality of feed holes (6) are circumferentially arranged at equal intervals along the shaping rod (4); preferably, the part of the shaping rod (4) that extends into the shaping hole (2) is configured having an uniform cross-section; preferably, the part of the shaping rod (4) that extends into the shaping hole (2) is configured as a cylinder, and preferably the cylinder has a diameter of not less than 5 μm, preferably 0.01-0.5 mm, more preferably 0.05-0.3 mm; preferably, the part of the shaping rod (4) that extends into the shaping hole (2) is configured as a regular polygonal prism, preferably the regular polygonal prism has a diameter of the circumscribed circle of not less than 5 μm, preferably 0.01-0.5 mm, more preferably 0.05-0.3 mm; preferably, the base (1) and the bracket (3) have conformed outer profile; preferably, the base (1) and the bracket (3) are configured to be detachably connected.

15. A use of the hydrogenation catalyst of any one of items 1-14 in hydrocracking.

16. A hydrocracking method, comprising the steps of: contacting a hydrocarbon oil with a hydrocracking catalyst under hydrocracking conditions, wherein the hydrocracking catalyst is the hydrogenation catalyst of any one of items 1-14.

The present disclosure can also be embodied as the following items.

1. A Fischer-Tropsch synthesis catalyst, characterized in that, comprising a support, and a metal active component and optionally the first metal promoter supported on the support, wherein the first metal promoter is at least one selected from the group consisting of transition metals;

wherein the support includes an internal channel penetrating the support, wherein the ratio of the cross-section area of the channel to the cross-section area of the support is 0.05-25:100;
wherein the support contains at least one of a heat-resistant inorganic oxide and a molecular sieve; and
wherein the metal active component is Co.

2. The Fischer-Tropsch synthesis catalyst of item 1, wherein the ratio of the cross-section area of the channel to the cross-section area of the support is 0.1-20:100, more preferably 0.2-9:100;
preferably, the channel is a passage of an uniform cross-section, and further preferably, the channel is in the shape of a cylinder and/or a regular polygonal prism;
further preferably, the diameter of the cylinder and the diameter of the circumscribed circle of the regular polygonal prism are independently not less than 6 μm, preferably 0.01-0.5 mm, more preferably 0.05-0.3 mm.

3. The Fischer-Tropsch synthesis catalyst of item 1 or 2, wherein the support is in the shape of spheres and/or strips, preferably strips, further preferably multi-lobe strips, and more preferably three-lobe strips, four-lobe strips or five-lobe strips;
preferably, the support has an equivalent diameter of not more than 5 mm, preferably 0.05 mm to 5 mm, further preferably 0.1 mm to 3 mm, and more preferably 0.5 mm to 2 mm.

4. The Fischer-Tropsch synthesis catalyst of any one of items 1-3, wherein the number of the channel is 1-9, preferably 1-5;
preferably, the cross-section of the support is a circle, and the channels extend along the central axis of the circle and/or are circumferentially arranged at equal intervals along the central axis;
preferably, the cross-section of the support is in a multi-lobe shape, the channels extend along the central axis of the circumscribed circle of the multi-lobe shape and/or extend along the central axis of the circumscribed circle of each lobe of the multi-lobe shape.

5. The Fischer-Tropsch synthesis catalyst of any one of items 1 to 4, wherein the heat-resistant inorganic oxide contains at least one of alumina, silica, titania, magnesium oxide, zirconia, thorium oxide, and beryllium oxide, preferably at least one of alumina, silica, titania and zirconia;
preferably, the molecular sieve comprises at least one of ten-membered ring silica-alumina molecular sieve, twelve-membered ring silica-alumina molecular sieve, fourteen-membered ring silica-alumina molecular sieve, and eighteen-membered ring silica-alumina molecular sieve;
more preferably, the molecular sieve is at least one selected from the group consisting of ZRP molecular sieve, Y molecular sieve, beta molecular sieve, mordenite, ZSM-5 molecular sieve, MCM-41 molecular sieve, Q molecular sieve, ZSM-12 molecular sieve, and MCM-22 molecular sieve; further preferably, at least one of Y molecular sieve, beta molecular sieve, ZSM-5 and mordenite;
preferably, the support is a heat-resistant inorganic oxide.

6. The Fischer-Tropsch synthesis catalyst of any one of items 1 to 5, wherein, based on the total amount of the catalyst, the metal active component is present in an amount of 5-80 wt %, preferably 20-40 wt %, on oxide basis;
preferably, the first metal promoter is at least one selected from the group consisting of Ni, Fe, Cu, Ru, Rh, Re, Pd and Pt;
preferably, based on the total amount of the catalyst, the first metal promoter is present in an amount of 0-40 wt %, more preferably 0.1-20 wt %, on oxide basis.

7. The Fischer-Tropsch synthesis catalyst of any one of items 1 to 6, further comprising the second metal promoter supported on the support, wherein the second metal promoter is at least one selected from the group consisting of alkali metals and alkaline earths metals, preferably at least one of Na, K, Mg and Ca;
preferably, based on the total amount of the catalyst, the second metal promoter is present in an amount of 1-20 wt %, more preferably 2-10 wt %, on oxide basis.

8. A method for preparing the Fischer-Tropsch synthesis catalyst of any one of items 1-7, comprising the steps of:
(1) mixing precursors of the support, water, optionally an extrusion aid, and optionally a peptizer, to obtain a mixture; subjecting the mixture to shaping and the first calcining to obtain the support, wherein the shaping results in an internal channel penetrating the support;
(2) impregnating the support obtained in step (1) with a solution containing precursors of the metal active component and optionally precursors of the first metal promoter, and then subjecting to drying and the second calcining.

9. The method of item 8, wherein in step (1), the extrusion aid is at least one selected from the group consisting of sesban powder, cellulose and derivatives thereof, starch and derivatives thereof, ethylene glycol and diethylene glycol;
the peptizer is at least one selected from inorganic acids, preferably nitric acid;
preferably, the first calcining is operated at a temperature of 350-700° C., preferably 450-650° C.; for a time of 1-10 h, preferably 2-6 h.

10. The method of item 8, wherein in step (2), the drying is operated at a temperature of 80-140° C. for a time of 1-10 h;
preferably, the second calcining is operated at a temperature of 350-750° C. for a time of 1-10 h;
preferably, the solution in step (2) further contains precursors of the second metal promoter.

11. The Fischer-Tropsch synthesis catalyst prepared by the method of any one of items 8-10.

12. A use of the Fischer-Tropsch synthesis catalyst of any one of items 1-7 and 11 in a Fischer-Tropsch synthesis reaction.

13. A Fischer-Tropsch synthesis method, characterized in that, comprising the steps of: contacting CO and $H_2$ with a catalyst under the conditions for Fischer-Tropsch synthesis reaction, wherein the catalyst is the Fischer-Tropsch synthesis catalyst of any one of items 1-7 and 11.

In the shaping of the support of the inventive catalyst, a one-step process is adopted to form a support with an internal channel. The support has an internal channel penetrating the support, which is beneficial to improve the effective utilization rate of the active components of the catalyst. At the same time, it is preferable to add a foaming agent when the support is shaping. The addition of the foaming agent allows the gas component to be wrapped in the shaped body, thereby increasing the proportion of the macropores and ultra macropores in the pore volume of the support, and increasing the penetration of the support. The supported catalyst of the present disclosure adopts a support with a structure having channels in combination with pores, which may enhance the diffusion of macromolecules, and thereby be beneficial to improving the activity of the catalyst and the accessibility to the active centers. When used in hydrocracking of hydrocarbon oils, it can achieve high yield of jet fuels and high catalytic activity at the same time. When used in Fischer-Tropsch synthesis reactions, the supported catalyst of the present disclosure leads to advantages of further improving the Fischer-Tropsch synthesis activity and the selectivity to C5+ hydrocarbons, and reducing the selectivity to methane. In addition, the supported catalyst of the present disclosure adopts a support with an optimized channel structure, thereby having a higher radial crushing strength. Therefore, the supported catalyst of the present disclosure is particularly suitable for use in fixed-bed reactors, such as microreactors, microchannel reactors, microchemical reactors or mesoscopic reactors. Those reactors require catalysts having features of high-strength, large porosity and small pressure drop.

Figure 1:
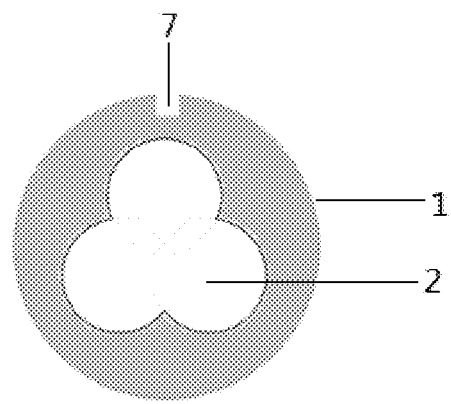
FIG. 1 is a schematic view showing the structure of the base of the orifice plate in accordance with one embodiment of the present disclosure.

DESCRIPTION OF REFERENCE SIGNS 1. base
2. shaping hole
3. bracket
4. shaping rod
5. mounting hole
6. feed hole
7. the first installation structure
8. the second installation structure
13. head
14. rod portion

DETAILED DESCRIPTION

It should be understood that the endpoints and any value in the ranges disclosed herein are not limited to the precise ranges or values, but encompass values close to those ranges or values. For ranges of values, it is possible to combine between the endpoints of each of the ranges, between the endpoints of each of the ranges and the individual points, and between the individual points to give one or more new ranges of values as if these ranges of values are specifically disclosed herein. Other than in the examples, all numerical values of parameters in this specification are to be understood as being modified in all instances by the term "about" whether or not "about" actually appears before the numerical values.

Unless indicated to the contrary, the orientation words used herein such as "up, down, left, right" usually refer to the "up, down, left, right" shown with reference to the drawings, and the orientation words used herein such as "inner and outer" refer to the inner and outer relative to the contour of each component itself.

In the present disclosure, the items defined by "at least one", "one or more" and "and/or" refer to the presence of the listed items or any combination thereof.

The first aspect of the present disclosure provides a supported catalyst, comprising a support and a metal active component supported on the support, wherein the metal active component is at least one selected from the group consisting of Group VIB metal elements and Group VIII metal elements; wherein the support contains at least one of heat-resistant inorganic oxides and molecular sieves; wherein the support includes an internal channel penetrating the support, wherein the ratio of the cross-section area of the channel to the cross-section area of the support is 0.05-3:100; and wherein the difference R between the water absorption rate and the BET pore volume of the support is not less than 0.2 mL/g.

The "internal channel penetrating the support" herein refers to the channel existing inside the support which makes the support have a structure with good penetration. The channel runs through the support. In a variant, the channel in the support extends along the longitudinal axis of the support and connects the two ends of the support.

According to a preferred embodiment of the present disclosure, the Group VIB metal element is Mo and/or W, and the Group VIII metal element is Co and/or Ni. Thus, the metal active component may be one or more of Mo, W, Co and Ni.

The Group VIB metal element and the Group VIII metal element may be respectively supported on the support in various forms commonly used in the art. For example, the Group VIB metal element and the Group VIII metal element may be respectively in form of oxides and/or sulfides supported on the support. That is, the supported catalyst of the present disclosure includes the oxidized catalyst before being sulfided, and also includes the sulfided catalyst after being sulfided.

The content of the Group VIB metal element and the Group VIII metal element in the supported catalyst can be selected within a wide range. Preferably, based on the total amount of the catalyst, the Group VIB metal element is present in an amount of 10-35 wt %, preferably 15-30 wt %; the Group VIII metal element is present in an amount of 2-15 wt %, preferably 2.5-10 wt %; and the support is present in an amount of 50-88 wt %, preferably 60-82.5 wt %, all on oxide basis.

According to another preferred embodiment of the present disclosure, the metal active component is at least one of Group VIII metal elements, preferably at least one of Ni, Fe and Co, and more preferably Co. In a variant, the catalyst further includes the first metal promoter supported on the support, wherein the first metal promoter is at least one of transition metals. The metal active component and the first metal promoter are different elements. Preferably, the first metal promoter is at least one selected from the group consisting of Cu, Ru, Rh, Re, Pd and Pt.

The content of Co and the first metal promoter in the catalyst can be selected within a wide range in the present disclosure. Preferably, based on the total amount of the catalyst, Co is present in an amount of 5-80 wt %, more preferably 20-40 wt %, on oxide basis. Based on the total amount of the catalyst, the first metal promoter is present in an amount of 0-40 wt %, more preferably 0.1-20 wt %, on oxide basis.

In a variant, the supported catalyst further contains the second metal promoter supported on the support, wherein the second metal promoter is at least one selected from the group consisting of alkali metals and alkaline earth metals. The alkali metals include, but are not limited to, Li, Na, and K. The alkaline earth metals include, but are not limited to, Mg and Ca. Preferably, the second metal promoter is at least one of Na, K, Mg and Ca, for example, K and/or Mg.

The content of the second metal promoter can be selected within a wide rang in the present disclosure. Preferably, based on the total amount of the catalyst, the second metal promoter is present in an amount of 0-20 wt %, preferably 1-20 wt %, more preferably 2-10 wt %, on oxide basis.

In a variant, the supported catalyst includes a support and a metal active component, the first metal promoter and the second metal promoter supported on the support, wherein the metal active component is at least one selected from the group consisting of Ni, Fe and Co, the first metal promoter is at least one selected from the group consisting of Cu, Ru, Rh, Re, Pd and Pt; the second metal promoter is K and/or Mg; and based on the total amount of the catalyst, the support is present in an amount of 30-75 wt %, the metal active component is present in an amount of 20-40 wt %, the first metal promoter is present in an amount of 0.1-20 wt %, and the second metal promoter is present in an amount of 2-10 wt %, all on oxide basis.

In the present disclosure, the water absorption rate is the water absorption rate after wiping off. They are used interchangeably herein. Unless otherwise specified, the water absorption rate after wiping off is obtained by impregnating the dry support of the present disclosure in deionized water for more than 30 minutes at room temperature (20-25° C.), and then wiping off with filter papers after filtration to obtain the mass of the support after water absorption. The ratio of the difference between the obtained mass and the mass of the support before water absorption to the mass of the support before water absorption is the water absorption rate after wiping off.

According to an embodiment of the present disclosure, the support has a water absorption rate after wiping off in a range of 0.8-2 mL/g, preferably 0.9-1.5 mL/g.

According to an embodiment of the present disclosure, the support has a BET pore volume of 0.62-1.3 mL/g, preferably 0.7-1.1 mL/g.

In the present disclosure, unless otherwise specified, the BET pore volume is measured according to the method clarified in RIPP 151-190.

According to the present disclosure, preferably, the difference R between the water absorption rate and the BET pore volume of the support is 0.2-0.8 mL/g, more preferably 0.2-0.5 mL/g.

According to the present disclosure, preferably, the difference R between the water absorption rate and the BET pore volume of the support comprises 10-50%, preferably 15-35% of the water absorption rate of the support. The larger value for the support of the present disclosure indicates that the macropores or ultra macropores comprise the larger proportion of the total pore volume in the support of the present disclosure. As mentioned above, unless otherwise specified, in the present disclosure, the pore volume of the support is measured according to the BET method, and the water absorption rate (the water absorption rate after wiping off) is measured according to the water absorption method. Accordingly, the difference R between the water absorption and the BET pore volume is used to indicate the pore volume of the macropores or ultra macropores, and the water absorption rate is used to indicate the total pore volume of the support.

According to the present disclosure, preferably, the ratio of the cross-section area of the channel to the cross-section area of the support is 0.1-3:100, preferably 0.2-3:100. The catalyst of the present disclosure adopts a support with a structure involving channels in combination with pores, which may effectively utilize the active components of the catalyst to improve the activity of the catalyst, while ensuring the strength thereof.

According to the present disclosure, preferably, the support has a radial crushing strength of 14-30 N/mm, preferably 18-26 N/mm. Unless otherwise specified, the radial crushing strength of the support is measured in the present disclosure on a QCY-602 crushing strength tester (manufactured by the Soda Research Institute of the Ministry of Chemical Industry) according to the method clarified in GB3635-1983.

The support used in the catalyst of the present disclosure has channels with an optimized structure, thereby has higher mechanical strength, which in turn improves the mechanical strength of the corresponding supported catalyst. In addition, the support used in the catalyst of the present disclosure has a structure involving channels in combination with pores, which can effectively improve the activity of the catalyst and the accessibility to the active centers, and is very suitable for the diffusion of macromolecules.

In the present disclosure, the shape of the support may be selected within a wide range. The shape of the support can be various shapes commonly used in the field. The shape of the support may be regular or irregular, preferably a regular shape. For example, the support may have a shape of spheres, strips, rings, honeycomb or butterfly. The strips mentioned in the present disclosure can be cylinder strips, elliptical strips (equivalent to two-lobe strips) or multi-lobe strips. There is not any limitation on the shape of the strips in the present disclosure. The sphere mentioned in the present disclosure can be a regular sphere or an irregular sphere. That is, the outer curve of the cross-section of the support can be a circle or an imperfect circle. There is not any limitation on the length and distribution of the support in the shape of strips in the present disclosure.

Preferably, the support is in the shape of spheres and/or strips, further preferably strips, and more preferably multi-lobe strips.

The strip mentioned herein refers to a material with a three-dimensional structure which is made by extruding or pressing and has a length not less than 50% of the diameter of the circumscribed circle thereof. There is not any limitation on the length and distribution of the support in the shape of strips in the present disclosure.

In the present disclosure, the support in the shape of multi-lobe strips means that the cross-section of the support is in the multi-lobe shape. There is not any limitation on the size of each lobe of the multi-lobe shape and the ratio of the size of one lobe to the size of the other lobes in the present disclosure. That is, the multi-lobe shape can be a regular multi-lobe shape, an irregular multi-lobe shape, or a deformed multi-lobe shape. There is not any limitation on the number of lobes, the shape of the lobes, and the ratio among the lobes of the multi-lobe shape in the present disclosure. According to the present disclosure, the multi-lobe strip shape may be at least one of a three-lobe strip shape, a four-lobe strip shape, a five-lobe strip shape, a six-lobe strip shape and the like.

According to a preferred embodiment of the present disclosure, the support is in the shape of spheres and/or strips, and the support has an equivalent diameter of not greater than 5 mm, preferably not greater than 3 mm, more preferably not greater than 2 mm, and even more preferably 0.8-2 mm.

According to an embodiment of the present disclosure, if the support is in a shape other than the above, the support may have an outer shape with minimal cross-section dimension of not more than 5 mm, preferably not more than 3 mm, and more preferably not more than 2 mm.

According to a preferred embodiment of the present disclosure, the catalyst has a bulk density of 0.5-1 g/mL, more preferably 0.6-0.9 g/mL. The catalyst of the present disclosure has a lower bulk density.

In the present disclosure, the bulk density of the catalyst is measured by a conventional method. In particular, the method may include: crushing the catalyst, sieving out particles of 16-20 mesh, adding the sieved particles into a 500 mL measuring cylinder, and getting the weight G and the visual volume V. The bulk density of the catalyst=G/V.

In the present disclosure, the channel can be formed in various reasonable shapes, which can be regular or irregular. From the viewpoint of ease processing, the channel is preferably in a regular shape. Along the flow direction, the cross-sections of the channel may be the same or different (gradually increase or gradually decrease). In the cases wherein the cross-sections of the channel gradually increase along the flow direction, the channel includes, but is not limited to, a cone. In the cases wherein the cross-sections of the channel gradually decrease along the flow direction, the channel includes, but is not limited to, an inverted cone.

Preferably, the channel is a passage of an uniform cross-section. The cross-section of the channel may be regular or irregular, and is preferably in a regular shape. Such preferred arrangement may facilitate processing, and at the same time the support having a penetrating channel structure with a corresponding shape may be more advantageous to the diffusion of macromolecules.

The channel may have various shapes that can be processed. From the viewpoint of ease processing, preferably, the channel is in the shape of a cylinder and/or a regular polygonal prism. Correspondingly, the cross-section of the channel is a circle and/or a regular polygon. Such preferred arrangements not only facilitate processing, but also effectively ensure the stability of the support. In such cases, the inner surface of the catalyst is more regular, avoiding stress accumulation caused by the presence of sharp walls in the channel structure, reducing the probability of collapsing of the catalyst, and improving the compactness and strength of the support. It should be noted that in the present disclosure, the circle and regular polygon also include imperfect circles and/or regular polygons.

Further preferably, when the channel is in the shape of a cylinder, the circle cross-section thereof has a diameter of not less than 5 μm, preferably 0.01-0.5 mm, and more preferably 0.05-0.3 mm.

Further preferably, when the channel is in the shape of a regular polygonal prism, the circumscribed circle of the regular polygon cross-section thereof has a diameter of not less than 5 μm, preferably 0.01-0.5 mm, and more preferably 0.05-0.3 mm.

In the present disclosure, the regular polygonal prism may be a triangular prism, a quadrangular prism, a pentagonal prism and the like. Accordingly, the cross-section of the channel of the support is correspondingly a regular triangle, a square, a regular pentagon and the like The number of channels may be selected within a wide range in the present disclosure. It may be selected by those skilled in the art by comprehensively considering the strength and bulk density. It may be one or more than two, which may be appropriately selected according to the actual demand for the number of channels. Preferably, the number of the channels is 1-10, preferably 1-6.

It should be noted that if the number of the channels is more than two, the ratio of the cross-section area of the channel to the cross-section area of the support as defined above refers to the ratio of the total cross-section area of all channels and the cross-section area of the support.

The specific location of the channel may be selected within a wide range in the present disclosure, as long as it can penetrate the support. When the number of the channel is one, it is preferable that the channel extends along the central axis of the support. In such a case, when the cross-section of the support is a circle, the channel extends along the central axis of the support in the shape of cylinder; when the cross-section of the support is in a multi-lobe shape, the channel extends along the central axis of the circumscribed cylinder of the multi-lobe shape.

When the number of the channels is more than two, there is no special limitation on the relative positions of the channels. Preferably, the channels are uniformly distributed. Such preferred arrangements are more advantageous to ensuring a more balanced distribution of forces on the support, and further optimizing the overall strength of the support. Preferably, the uniform distribution means that the distances from each channel to the center of the circumscribed circle of the cross-section of the support are equal, more preferably the distances between each channel are equal, and more preferably the distances from each channel to the center of the circumscribed circle of the cross-section of the support are equal to the distances from each channel to the edge of the support.

According to a preferred embodiment of the present disclosure, the cross-section of the support is a circle, and the channels extend along the central axis of the cylinder support and/or are circumferentially arranged at equal intervals along the central axis. Such preferred arrangements result in uniform distribution of channels, which may effectively avoid sharp drop of strength in parts of the support associated with the incorporation of the channels therein, and thereby can ensure the mechanical strength of the support.

According to another preferred embodiment of the present disclosure, the cross-section of the support is in a multi-lobe shape, and the channels extend along the central axis of the circumscribed cylinder of the multi-lobe shape and/or along the central axis of the circumscribed cylinder of each lobe of the multi-lobe shape. Such preferred arrangements result in uniform distribution of channels, which may effectively avoid sharp drop of strength in parts of the support associated with the incorporation of the channels therein, and thereby can ensure the mechanical strength of the support.

In the present disclosure, the support may have composition commonly used in the art. The support may contain at least one of a heat-resistant inorganic oxide and a molecular sieve.

There is not special limitation on the type of the heat-resistant inorganic oxide in the present disclosure. It may be a heat-resistant inorganic oxide commonly used in the art. For example, the heat-resistant inorganic oxide may be at least one selected from the group consisting of alumina, silica, titania, magnesium oxide, zirconia, thorium oxide and beryllium oxide. Specific examples thereof may include, but are not limited to, alumina, silica, zirconia, titania, magnesium oxide, thorium oxide, beryllium oxide, alumina-titania, alumina-magnesium oxide, silica-magnesium oxide, silica-zirconia, silica-thorium oxide, silica-beryllium oxide, silica-titanium oxide, titania-zirconia, silica-alumina-zirconia, silica-alumina-thorium oxide, silica-alumina-titania or silica-alumina-magnesium oxide. Preferably, the heat-resistant inorganic oxide is at least one of alumina, silica, titania and zirconia. More preferably, the heat-resistant inorganic oxide is alumina.

The term "alumina" used herein refers to a compound represented by the formular $mAl_2O_3 \cdot nH_2O$, where m and n are any numbers, which may be integers or fractions. There is not limitation on the crystalline form of the alumina in the present disclosure.

The term "molecular sieve" used herein refers to a material with a regular crystalline structure and pores, which has a framework formed from silicon element and aluminum element. It is also referred to as zeolite. It may further contain other elements, such as at least one of P, Ti, Ge and Ga. There is not any limitation on the elements for forming the molecular sieve in the present disclosure.

The molecular sieve in the present disclosure may be one, two or more molecular sieves, or may be a mixed crystal or twin crystal of two molecular sieves. The term "two molecular sieves" used herein refers to two different types of molecular sieves, or two molecular sieves which belong to the same type but have different properties (for example, different silicon-to-aluminum ratios).

The term "more molecular sieves" used herein refers to three or more molecular sieves, which may be different types of molecular sieves, or molecular sieves which belong to the same type but have different properties. Each molecular sieve may comprise 0.1-80 wt % of the support.

The two molecular sieves may be in a ratio of 10:1 to 1:10, 5:1 to 1:5, 3:1 to 1:3, 2:1 to 1:2, 1:1 and the like. The ratio of the two molecular sieves may be any value.

According to the present disclosure, the molecular sieve may be at least one selected from the group consisting of ten-membered ring silica-alumina molecular sieve, twelve-membered ring silica-alumina molecular sieve, fourteen-membered ring silica-alumina molecular sieve and eighteen-membered ring silica-alumina molecular sieve. There is not limitation on the open size and pore size of the molecular sieve in the present disclosure.

There is not limitation on the silicon-to-aluminum ratio of the molecular sieve in the present disclosure. The silicon-to-aluminum ratio mentioned herein refers to the ratio of $SiO_2/Al_2O_3$.

According to a preferred embodiment of the present disclosure, the molecular sieve is at least one selected from the group consisting of ZRP molecular sieve, Y molecular sieve, beta molecular sieve, mordenite, ZSM-5 molecular sieve, MCM-41 molecular sieve, Q molecular sieve, ZSM-12 molecular sieve and MCM-22 molecular sieve, preferably, at least one of Y molecular sieve, beta molecular sieve, ZSM-5 molecular sieve and mordenite.

The molecular sieve may be commercially available, or may be prepared by any known method.

The Y molecular sieve mentioned herein may be a Y molecular sieve with a unit cell constant in the range of 2.452-2.475 nanometers and a silica/alumina molar ratio in the range of 3.5-7. It may be an ultra-stable Y molecular sieve prepared by exchanging a Y molecular sieve with ammonium ions and then subjecting to one or more hydrothermal treatments. Such an ultra-stable Y molecular sieve may have a unit cell constant of 2.420-2.455 nanometers and a silica/alumina molar ratio in the framework of up to 100, preferably up to 60. It may also be a phosphorus-containing ultra-stable Y molecular sieve prepared by exchanging a Y molecular sieve with a solution of one or more inorganic ammonium phosphides and then subjecting to one or more hydrothermal treatments. It may also be a rare earth-containing Y molecular sieve prepared by treating a Y molecular sieve with an aqueous solution of a rare earth compound, in combination with one or more hydrothermal treatments.

According to the present disclosure, preferably, based on the total amount of the support, the heat-resistant inorganic oxide is present in an amount of 1-99 wt % and the molecular sieve is present in an amount of 1-99 wt %; further preferably, based on the total amount of the support, the heat-resistant inorganic oxide is present in an mount of 70-97 wt % and the molecular sieve is present in an amount of 3-30 wt %.

In the present disclosure, when the heat-resistant inorganic oxide and the metal promoters involve the same metal element, the amount thereof is counted into that of the metal promoters.

The second aspect of the present disclosure provides a method for preparing the above-mentioned supported catalyst, comprising the steps of:

(I) mixing precursors of the support, water, optionally a foaming agent, optionally an extrusion aid and optionally a binder, to obtain a mixture;

(II) shaping the mixture to obtain a shaped product with an internal channel penetrating the shaped product;

(III) subjecting the shaped product obtained in step (II) to the first calcining to obtain the support;

(IV) impregnating the support obtained in step (III) with a solution containing precursors of the metal active component, and then subjecting to drying and the second calcining.

According to the present disclosure, the term "optionally" means that the relating ingredients may or may not be added. In the mixing of step (I) of the present disclosure, the foaming agent may or may not be added; the extrusion aid may or may not be added; and the binder may or may not be added. In a variant, it is preferable to add the foaming agent.

According to the present disclosure, precursors of the support may be any materials that can be converted into the support by the first calcining of step (III). Particularly, precursors of the support may be at least one selected from the group consisting of heat-resistant inorganic oxides, precursors of heat-resistant inorganic oxides and molecular sieves. Preferably, precursors the support may be heat-resistant inorganic oxides and/or precursors of heat-resistant inorganic oxides. Precursors of the heat-resistant inorganic oxide may be any materials that can be converted into the heat-resistant inorganic oxide by the first calcining of step (III). The selection of the heat-resistant inorganic oxide is described above, and not repeated here.

The selection of the molecular sieve is described above, and not repeated here.

According to a preferred embodiment of the present disclosure, precursors of the heat-resistant inorganic oxide may be precursors of alumina, including for example, but not limited to, hydrated alumina (for example, aluminum hydroxide, pseudo-boehmite), a gel containing hydrated alumina, and a sol containing hydrated alumina. For example, precursors of the alumina may be dried powder of alumina sol. The dried powder of alumina sol may be commercially available (for example, from Sinopec Catalyst Ltd. Co, Changling Company), or may be prepared by any known method. There is not any limitation thereon in the present disclosure.

In the preparation method of the present disclosure, the amount of the heat-resistant inorganic oxide and/or precursors of the heat-resistant inorganic oxide and the molecular sieve may be selected within a wide range. Those skilled in the art can identify the appropriate amount for any specific conditions. The possible range of the amount is described above, and not repeated here.

According to the present disclosure, the foaming agent has the ability to encapsulate gas. It may be an organic material or an inorganic material. It may be a pure substance or a mixture of multiple ingredients. The foaming agent may be at least one selected from the group consisting of physical foaming agents, chemical foaming agents, synthetic surfactant foaming agents, animal protein based foaming agents and plant based foaming agents. Preferably, the foaming agent is an animal protein based foaming agent and/or a plant based foaming agent. The animal protein based foaming agent is preferably at least one selected from the group consisting of animal hoof based foaming agents, animal hair based foaming agents and animal blood gel based foaming agents. The plant based foaming agent is preferably at least one selected from the group consisting of rosin soap based foaming agents and tea saponins.

According to a preferred embodiment of the present disclosure, the foaming agent is an animal protein based foaming agent, for example, an animal hoof based foaming agent and/or egg white. The inventor of the present invention found in the research that, compared to traditional physical foaming agents, chemical foaming agents and synthetic surfactant foaming agents, animal protein based foaming agents have obvious advantages on more effectively forming bubbles with high toughness and stability during the preparation of the support.

According to the method of the present disclosure, the foaming agent can be introduced in the form of a solution which uses water as the solvent or uses other organics as solvents, preferably uses water.

According to a preferred embodiment of the present disclosure, the animal protein based foaming agent is introduced in form of a solution of hydrolysates of the animal protein based foaming agent. When the protein is hydrolyzed, protein macromolecules of longer peptide chains become a mixture of soluble medium and small molecules of shorter chains. When dissolved in water, they may form a colloidal solution with a certain viscosity. In the solution, due to the presence of strong hydrophilic groups, such as a carboxyl group, hydroxyl and the like, and hydrophobic groups such as long-chain hydrocarbon groups, as well as other factors such as the asymmetric properties of molecules, the surface tension may be reduced, which facilitates the formation of interfaces. In addition, the peptide chains of those small and medium molecules may spread along the interfaces and form a protective net by intermolecular hydrogen bonds, which strengthens the interfaces and thereby is more advantageous to the forming and stabilizing of foams.

There is not special limitation in the present disclosure on the measures for obtaining the solution of hydrolysates of the animal protein based foaming agent by hydrolyzing the animal protein based foaming agent. Based on the above description, those skilled in the art can prepare the solution of hydrolysates of the animal protein based foaming agent via any measure. For example, it may be carried out according to the method disclosed in Research on protein-type concrete foaming agent[J]., Ma Zhijun, Li Xiaoyun, Ma Xuelei, et al. Building Science, 2009, 25 (5): 73-76.

In order to promote the hydrolyzing of animal proteins, a hydrolysis accelerator may be appropriately added during the hydrolyzing. There is not specific limitation thereon in the present disclosure.

According to the method of the present disclosure, preferably, the extrusion aid is at least one selected from the group consisting of sesban powder, cellulose and derivatives thereof, starch and derivatives thereof, ethylene glycol and diethylene glycol. The derivatives of starch may be one or more of oxidized starch, esterified starch, carboxymethyl starch, cationic starch, hydroxyalkyl starch and polymeric starch. The derivatives of cellulose may be one or more of cellulose ether, cellulose ester and cellulose ether ester. The examples illustrate cases wherein sesban powder is used as the extrusion aid. However, the present disclosure is not limited thereto.

According to the method of the present disclosure, the type of binder may be selected within a wide range, including, for example, at least one of hydroxymethyl cellulose, inorganic acids, starch and derivatives thereof, silica sol or aluminum sol.

According to the method of the present disclosure, there is not specific limitation on measures for mixing precursors of the support, the foaming agent, water, optionally the extrusion aid and optionally the binder, as long as precursors of the support, the foaming agent, water, optionally the extrusion aid and optionally the binder are mixed. Preferably, the mixing of step (I) includes: mixing precursors of the support and the extrusion aid, and then adding the foaming agent, the binder and water to obtain the mixture. In such preferred embodiments, precursors of the support and the extrusion aid are mixed firstly to obtain a mixed powder, to which the foaming agent, binder and water are added. It is more advantageous to improving the catalytic performance of the prepared catalyst.

More preferably, the mixing of step (I) includes: mixing precursors of the support and the extrusion aid to obtain a mixed powder; foaming the foaming agent, the binder and water to obtain a foaming liquid; and mixing the mixed powder and the foaming liquid. Such preferred arrangements are more advantageous to improving the catalytic performance of the catalyst prepared with the obtained support. In a variant, the foaming may be performed with foaming agent in presence of the mixed powder, and then water and binder are introduced.

According to the present disclosure, preferably, the foaming agent is an animal protein based foaming agent. The amount of the foaming agent can be selected within a wide range. For example, relative to 100 g of precursors of the support on a dry basis, the foaming agent is present in an amount of 0-50 mL, preferably 0.1-50 mL, more preferably 0.5-20 mL. Such arrangements are more advantages to making the obtained support have both higher mechanical strength and better pore structure.

According to the present disclosure, preferably, the foaming agent is a plant based foaming agent, and is present in an amount of 0-5 g, preferably 0.1-5 g.

According to the present disclosure, preferably, relative to 100 g of precursors of the support on a dry basis, the extrusion aid is present in an amount of 0-6 g, preferably 0.1-6 g, preferably 2-4 g.

According to the present disclosure, preferably, relative to 100 g of precursors of the support on a dry basis, the binder is present in an amount of 0-10 g, preferably 0.1-10 g, preferably 0.5-6 g.

According to the present disclosure, water is used as a dispersion medium in the mixture. The amount of water is identified by the standard for making the other ingredients mixed uniformly.

According to the present disclosure, the mixture may optionally contain a peptizer, but preferably does not contain a peptizer. In the existing methods for preparing supports, a peptizer, such as dilute nitric acid, needs to be added. In the method for preparing supports of the present disclosure, however, the peptizer may or may not be added.

There is not specific limitation on the conditions for the first calcining of the shaped product in the present disclosure. Those conditions commonly used in the art may be used. Generally, the first calcining may be operated at a temperature of 350-700° C., preferably 450-650° C., for a time of 1-10 hours, preferably 2-6 hours. The first calcining may be performed under an oxygen-containing atmosphere (for example, air), or may be performed under an inert atmosphere. The inert atmosphere refers to a gas that is inactive under the conditions of the drying or calcining, for example nitrogen and the noble gas (such as argon).

Before the first calcining of the shaped product, the method may further comprise drying the shaped product. The drying may be performed under conventional conditions in the art. For example, the drying may be performed at a temperature of 100-200° C., for a time of 2-12 hours. The drying may be performed under normal pressure or under reduced pressure. There is not specific limitation thereon. The drying may be performed under an oxygen-containing atmosphere, or may be performed under an inert atmosphere.

According to the present disclosure, the method for preparing the support may further comprise: kneading the mixture, and then subjecting to the shaping. Specifically, the mixture may be fed into an extruder, kneaded therein, and then extruded to obtain the shaped product.

Figure 2:
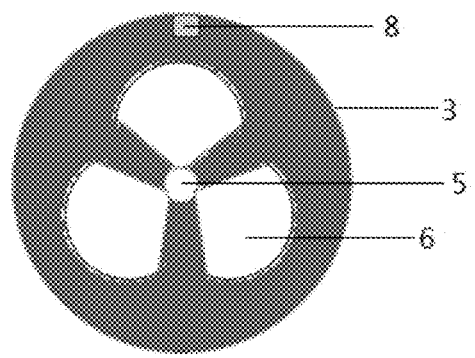
FIG. 2 is a schematic view showing the structure of the bracket of the orifice plate in accordance with one embodiment of the present disclosure.
Figure 3:
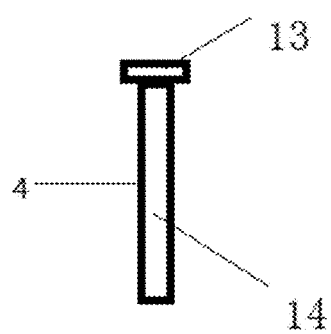
FIG. 3 is a schematic view showing the structure of the shaping rod of the orifice plate in accordance with one embodiment of the present disclosure.

According to the present disclosure, the shaping results in the shaped product with an internal channel penetrating the shaped product. The mode for the shaping can be selected within a wide range, as long as it is possible to obtain the shaped product with an internal channel penetrating the shaped product. Preferably, the shaping of step (II) is performed in an extruder, wherein the extruder includes a main body and an orifice plate for extruding strips, and the main body is configured to allow the mixture pass through the orifice plate to be shaped. As shown in FIG. 1-3, the orifice plate includes a base 1 with a shaping hole 2, a bracket 3 with at least one feed hole 6, and at least one shaping rod 4. The bracket 3 is arranged over the base 1. The shaping hole 2 is communicated with the feed hole 6. The bracket 3 is further provided with at least one mounting hole 5 allowing the shaping rod 4 pass through. The shaping rod 4 is configured to penetrate the shaping hole 2. In such preferred arrangements, the shaping hole 2 of the orifice plate and the shaping rod 4 penetrating the shaping hole 2 together form a shaping cavity, through which the mixture is formed into a corresponding shape. Such preferred arrangements may prepare the support with an internal channel via a one-step process. Not only the preparation is easy for operating, but also the prepared support has both high strength and high utilization rate of active metals.

According to the present disclosure, the expression "for extruding strips" means that the orifice plate is used for extruding strips. However, the expression "for extruding strips" does not limit the structure of the orifice plate of the present disclosure.

According to the present disclosure, those skilled in the art can understand that the shaping hole 2 penetrates the base 1, while the shaping rod 4 is sleeved in (or penetrates) the shaping hole 2, so as to be able to obtain the support with an internal channel penetrating the support.

According to the present disclosure, the shaping rod 4 is configured to penetrate the shaping hole 2, which can be understood as the shaping rod 4 having a length such that one end of the shaping rod 4 is located at the end of the base 1 away from the bracket, or one end of the shaping rod 4 is outside the end of the base 1 away from the bracket.

According to a preferred embodiment of the present disclosure, the ratio of the cross-section area of the shaping rod 4 to the cross-section area of the shaping hole 2 corresponds to the above-mentioned ratio of the cross-section area of the channel to the cross-section area of the support. For example, it may be 0.05-3:100, preferably 0.1-3:100, more preferably 0.2-3:100. Such preferred arrangements may be more advantageous to making the prepared support have both high strength and high utilization rate of active metals.

According to the present disclosure, it should be understood that the shape of the shaping hole 2 is actually the shape of the prepared support. The shape of the shaping hole 2 may be selected according to the above description with respect to the shape of the support.

According to a preferred embodiment of the present disclosure, the cross-section of the shaping hole 2 is a circle or a multi-lobe shape. There is not specific limitation on the circle and the multi-lobe shape. They may be selected according to the above description with respect to the shape of the support.

The size of the shaping hole 2 may be selected within a wide range in the present disclosure. Those skilled in the art can make an appropriate choice according to the requirements for the size of the support. The method for preparing the support of the present disclosure is particularly suitable for preparing supports of small-size. Preferably, the shaping hole 2 has an equivalent diameter of not more than 5 mm, preferably not more than 3 mm, further preferably not more than 2 mm, and more preferably 0.8-2 mm.

The number of the shaping rod 4 can be selected within a wide range in the present disclosure. It may be one or more than two, which may be appropriately selected according to the requirements for the number of the internal channel in the support. Preferably, the number of the shaping rod 4 may be 1-10, more preferably 1-6. It should be understood that the number of the shaping rod 4 matches the number of the above-mentioned channel in the support.

According to the present disclosure, the position of the shaping rod corresponds to the position of the channel in the support. Based on the above description with respect to the position of the channel in the support, those skilled in the art know how to set the shaping rod. Preferably, when the cross-section of the shaping hole 2 is a circle, the shaping rod 4 may extend along the central axis of the circle. If the number of shaping rod 4 is more than two, shaping rods 4 may be circumferentially arranged at equal intervals with respect to the center of the circle. According to a preferred embodiment of the present disclosure, the cross-section of the shaped hole 2 is a multi-lobe shape, then the shaped rods 4 extend along the central axis of the circumscribed cylinder of the multi-lobe shape and/or along the central axis of the circumscribed cylinder of each lobe of the multi-lobe shape. Such preferred arrangements result in a more reasonable design of the position of the internal channels in the support, so as to obtain uniform distribution of the channels, which may effectively avoid sharp drop of strength in parts of the support due to the incorporation of the channels therein, and thereby can improve the mechanical strength of the support.

According to an embodiment of the present disclosure, the number of the mounting hole 5 is equal to the number of the shaping rod 4.

Preferably, the shaping rod 4 is detachably connected to the bracket 3 through the mounting hole 5. In the present disclosure, the detachable connection makes one of the two connected parts do not move relative to the other when working; and when the work is finished, they can meet the demand for being able to be disassembled and replaced.

The shaping rod 4 may be arranged in various reasonable forms. For example, as shown in FIG. 3, the head 13 of the shaping rod 4 is installed in the mounting hole 5, and the rod portion 14 of the shaping rod extends towards the outlet of the shaping hole so as to be sleeved in (or penetrate) the mounting hole 5 and the shaping hole 2, which is easy to install and low in cost.

According to the present disclosure, the number of the feed hole 6 may be selected within a relatively wide range. For example, it may be 1-20, preferably 2-20. Preferably, as shown in FIG. 2, a plurality of feed holes 6 are circumferentially arranged at equal intervals along the shaping rod 4. Such preferred arrangements may be more advantageous to the uniform feeding of materials around the shaping rod 4, which may uniformly distribute forces around the shaping rod 4 and thereby may prolong the life of the shaping rod 4. On basis of the above, those skilled in the art can select the number of the feed hole 6 circumferentially arranged around each shaping rod 4 according to actual conditions. It should be understood that the feed hole 6 may be arranged in various reasonable forms. For example, as shown in FIG. 2, a plurality of feed holes 6 may be communicated with the mounting hole 5 or may be isolated from the mounting hole 5.

The shaping rod 4 is installed on the mounting hole 5 formed in the supporting structure of the bracket 3, and the supporting structure in turn covers the distribution area of the shaping hole 2. In this regard, in order to ensure the uniform distribution of raw materials and simplify the processing of the bracket 3, the bracket 3 is preferably configured to have a structure of an uniform cross-section, so that the thickness of the supporting structure (referring to the dimension along the discharging direction of the shaping hole) can be maximized. It enhances the capacity of the supporting structure to bear the compression action associated with the feeding of materials through the shaping hole, and improves the reliability of fixing the shaping rod. Preferably, the distribution area of the feed hole 6 at least overlaps the distribution area of the shaping hole 2, so that the bracket 3 can directly feed materials uniformly to areas of the shaping hole 2 of the base 1 through the feed hole 6. It may be advantageous to feeding materials to various areas at the inlet of the shaping hole 2 at the same time. In addition, the feed hole may be configured to have an overall outer profile of a multi-lobe structure having the same shape as that of the shaping hole.

Preferably, as shown in FIG. 3, the part of the shaping rod 4 that extends into the shaping hole 2 is configured to have a structure of an uniform cross-section. Such preferred arrangements may effectively ensure the uniformity of the processed shape of the prepared support, and be advantageous to obtaining a dense support with high density and high strength.

Among others, the shaping rod 4 may be formed into various reasonable shapes to facilitate the preparation of the support with internal channels having a corresponding shape. It should be understood that the part of the shaping rod 4 that extends into the shaping hole 2 corresponds to the internal channel in the support. Preferably, the part of the shaping rod 4 that extends into the shaping hole 2 is configured as a cylinder. In such a case, the prepared support may correspondingly have a channel of a cylinder, which makes the inner surface of the support smooth and regular, avoiding stress accumulation in the support caused by the presence of sharp walls in the channel structure, and reducing the probability of collapsing of the support.

Further preferably, the cylinder is configured to have a diameter of not less than 5 µm, preferably 0.01-0.5 mm, further preferably 0.05-0.3 mm.

In a further preferable case, the part of the shaping rod 4 that extends into the shaping hole 2 is configured as a regular polygonal prism. In such a case, the prepared support may correspondingly have a channel of a regular polygonal prism, making the inner surface of the support more regular, which is more advantageous to ensuring more uniform distribution of forces on the support, and further optimizing the overall strength of the support.

Further preferably, the regular polygonal prism is configured to have a circumscribed cylinder whose diameter is not less than 5 µm, preferably 0.01-0.5 mm, further preferably 0.05-0.3 mm.

In the present disclosure, the regular polygonal prism may be configured as any regular polygonal prism such as a triangular prism, a quadrangular prism, a pentagonal prism, and the like. Accordingly, the prepared support has a channel with a cross-section of the corresponding regular polygon such as a regular triangle, a square, a regular pentagon, and the like.

According to a preferred embodiment of the present disclosure, the base 1 and the bracket 3 are arranged in a detachable connection. The detachable connection makes one of the base 1 and the bracket 3 not move relative to the other when working; and when the work is finished, they can meet the demand for being able to be disassembled and replaced. Preferably, the base 1 and the bracket 3 are arranged in close contact with each other to avoid leaking. For example, the base 1 may be provided with the first installation structure 7 on the contacting surface to the bracket 3, and the bracket 3 may be provided with the second installation structure 8 which matches the first installation structure 7, on the contacting surface to the base 1. For example, one of the first installation structure 7 and the second installation structure 8 is configured as an installation groove, and the other is configured as an installation protrusion matching the installation groove.

According to an embodiment of the present disclosure, the base 1 and the bracket 3 have the same overall outer profile. Such arrangements may be more convenient for installation and operation.

According to the present disclosure, there is not specific limitation on the height of the base 1 and the bracket 3. Preferably, the ratio of the height of the base 1 to the height of the bracket 3 is set to 1:(0.2-5.0).

For ease understanding, now provided is a specific method of shaping, comprising the steps of: feeding the mixture obtained in step (I) into an extruder, wherein the extruder includes a main body and an orifice plate, and the main body is configured to allow the mixture pass through the orifice plate to be shaped. The mixture is fed through the feed hole 6 in the bracket 3 into the shaping cavity formed by the shaping hole 2 and the shaping rod 4, to obtain a shaped product with an internal channel penetrating the shaped product. The number and shape of the shaping rod 4 correspond to the number and shape of the channel, and the shape and size of the shaping hole 2 correspond to the shape and size of the shaped product.

The main body of the extruder may be those commonly used in the art, and is not repeated herein.

In the present disclosure, step (IV) adopts an impregnation method to introduce the metal active component onto the support. In a variant, the metal active component is one or more selected from Group VIB metal elements and Group VIII metal elements. It is possible to load the Group VIB metal elements and the Group VIII metal elements together onto the support by a co-impregnation method. It is also possible to separately load the Group VIB metal elements and the Group VIII metal elements onto the support by impregnating step by step. There is not specific limitation on the order of loading the Group VIB metal elements and the Group VIII metal elements. Specifically, precursors of the metal active component used in step (IV) may be a compound of the Group VIB metal elements and a compound of the Group VIII metal elements. The compound of the Group VIB metal elements and the compound of the Group VIII metal elements may be individually selected according to the needed types of the Group VIB metal elements and the Group VIII metal elements. When the Group VIB metal element is molybdenum and/or tungsten, the compound of Group VIB metal elements may be a compound of tungsten and/or a compound of molybdenum. In the present disclosure, examples of the compound of Group VIB metal elements may include, but are not limited to one or more of tungstic acid, molybdic acid, metatungstic acid, ethyl metatungstate, paramolybdic acid, ammonium molybdate, ammonium paramolybdate, ammonium metatungstate and ammonium ethyl metatungstate. When the Group VIII metal element is cobalt and/or nickel, the compound of Group VIII metal elements is preferably one or more of a salt of an oxygen-containing acid with nickel as the cation, a salt of an oxygen-free acid with nickel as the cation, a salt of an oxygen-containing acid with cobalt as the cation, and a salt of an oxygen-free acid with cobalt as the cation. In the present disclosure, examples of the compound of Group VIII metal elements may include, but are not limited to one or more of nickel nitrate, nickel sulfate, nickel acetate, nickel bicarbonate, cobalt nitrate, cobalt sulfate, cobalt acetate, cobalt bicarbonate, nickel chloride and cobalt chloride.

According to the present disclosure, various solvents commonly used in the art may be used to prepare a solution containing precursors of the metal active component, as long as precursors of the metal active component can be dissolved in the solvent to form a uniform and stable solution. For example, the solvent may be water.

In another variant, the catalyst contains Co as the metal active component and contains the first metal promoter. Correspondingly, according to a preferred embodiment of the present disclosure, the solution used in step (IV) further contains precursors of the first metal promoter. As mentioned above, it is possible to introduce the first metal promoter together with other components by co-impregnation, or to separately introduce it by impregnating step by step. In the variant, precursors of the metal active component may be any material that can be converted into cobalt oxides by the second calcining. For example, they may be one or more of cobalt hydroxide, cobalt chloride, cobalt sulfate, cobalt nitrate, cobalt carbonate, cobalt bicarbonate, cobalt formate, cobalt acetate, cobalt oxalate and cobalt naphthenate.

In a further variant, the catalyst may further contain the second metal promoter. Correspondingly, according to a preferred embodiment of the present disclosure, the solution used in step (IV) further contains precursors of the second metal promoter. As mentioned above, it is possible to introduce the second metal promoter together with other components by co-impregnation, or to separately introduce it by impregnating step by step.

Precursors of the first metal promoter and precursors of the second metal promoter may be any materials that can be converted into corresponding oxides of the first metal promoter and oxides of the second metal promoter by the second calcining, respectively. Precursors of the first metal promoter and precursors of the second metal promoter may be those commonly used in the art, for example one or more of soluble salts thereof, such as nitrate, acetate, bicarbonate, hydrochloride and soluble complexes thereof.

The concentrations of precursors of the metal active component, precursors of the first metal promoter and precursors of the second metal promoter in the solution may be selected according to the desired water absorption rate of the support and the target content of each component in the catalyst, which is well known by those skilled in the art.

The impregnation method may be various impregnation methods commonly used in the art. For example, it may be a pore saturation impregnation method. In the present disclosure, there is not specific limitation on the time and the repeating number of the impregnation, as long as it can ensure that the amount of the metal active component on the finally obtained catalyst meets the specific use requirements. Generally, the impregnating may be operated for a time of 0.5-12 hours.

According to the present disclosure, there is not specific limitation on the conditions for drying of the impregnated support. Generally, the drying may be operated at a temperature of 80-300° C., preferably 100-200° C., for a time of 0.5-24 hours, preferably 1-12 hours.

In the present disclosure, there is not specific limitation on the conditions for the second calcining of the dried impregnated support. Those conditions commonly used in the art may be adopted. Generally, the second calcining may be operated at a temperature of 350-700° C., preferably 400-650° C., for a time of 0.2-12 hours, preferably 1-10 hours. The second calcining may be performed under an oxygen-containing atmosphere.

The supported catalyst of the present disclosure can be used in the hydrogenation reaction of various hydrocarbon feedstocks, including but not limited to hydrodesulfurization, hydrodenitrogenation, saturation of olefins, saturations of aromatics, hydrocracking and hydroisomerization. The catalyst of the present disclosure can also be used as a Fischer-Tropsch synthesis catalyst. The supported catalyst of the present disclosure can also be used as an oxidation catalyst for aromatization reactions, photocatalytic reactions, immobilizations of enzymes and the like.

The various hydrocarbon feedstocks can be various heavy mineral oils or synthetic oils or mixed distillate oils thereof, such as straight run gas oils, vacuum gas oils, demetallized oils, atmospheric residues, deasphalted vacuum residues, coker distillates, catalytic cracking distillates, shale oils, tar sand oils, coal liquids and the like.

The inventor of the present invention found that the catalyst of the present disclosure is particularly suitable as a hydrocracking catalyst. Thus, the third aspect of the present disclosure provides the use of the supported catalyst of the present disclosure in hydrocracking. The supported catalyst of the present disclosure may be used for hydrocracking of various hydrocarbon oils, to produce hydrocarbon fractions with lower boiling points and lower molecular weights.

According to the fourth aspect of the present disclosure, the present disclosure provides a hydrocracking method, comprising the steps of: contacting a hydrocarbon oil with a hydrocracking catalyst under hydrocracking conditions, wherein the hydrocracking catalyst is the supported catalyst of the present disclosure.

The supported catalyst, the preparation method thereof, and the types of hydrocarbon oils have been described in detail above, and are not repeated herein.

There is not specific limitation on remained conditions for the hydrocracking method of the present disclosure. Those conditions commonly used in the art may be adopted. Generally, the hydrocracking conditions may include: a temperature of 200-650° C., preferably 300-510° C.; a pressure of 3-24 MPa, preferably 4-15 MPa in gauge pressure; a volume ratio of hydrogen to oils of 100-5000, preferably 200-1500; and a liquid hourly volumetric space velocity of 0.1-30 $h^{-1}$, preferably 0.2-5 $h^{-1}$.

According to the present disclosure, the catalyst is preferably pre-vulcanized before being used in hydrocracking. The conditions for the pre-vulcanization may be those conditions commonly used in the art. For example, the conditions for the pre-sulfurization may include: pre-sulfurizing with sulfur, hydrogen sulfide, or sulfur-containing materials at a temperature of 140-370° C. in the presence of hydrogen. According to the hydrocracking method of the present disclosure, the pre-sulfurization may be performed outside the reactor, or may be performed in-situ in the reactor. The specific conditions for the pre-vulcanization are well known to those skilled in the art, and not repeated herein. The catalyst of the present disclosure may be used directly without any pretreatment, or may be used after a reduction treatment.

The inventor of the present invention found that the supported catalyst of the present disclosure is particularly suitable as a Fischer-Tropsch synthesis catalyst. Thus, the fifth aspect of the present disclosure provides the use of the above mentioned supported catalyst in a Fischer-Tropsch synthesis reaction.

The sixth aspect of the present disclosure provides a method of Fischer-Tropsch synthesis, comprising the steps of: contacting CO and $H_2$ with a Fischer-Tropsch synthesis catalyst under conditions for Fischer-Tropsch synthesis reaction, wherein the Fischer-Tropsch synthesis catalyst is the above mentioned supported catalyst.

In the present disclosure, the catalyst can be activated before being used in the Fischer-Tropsch synthesis reaction. There is not specific limitation on the conditions and operations of the activation treatment. It may be performed according to those commonly used in the art. Preferably, the activation treatment includes: performing reduction activation at a temperature of 120-500° C. in the presence of hydrogen. The reduction activation may be performed outside the reactor or in-situ in the reactor to convert the catalyst into an elemental metal active material. The activation treatment may be performed for a time of 1-10 h.

In the present disclosure, preferably, the conditions for the Fischer-Tropsch synthesis may include: a temperature of 150-300° C., preferably 170-250° C., more preferably 190-230° C.; a pressure of 0.2-16 MPa, preferably 1.0-10 MPa; a gas space velocity of 200-400000 $h^{-1}$, preferably 500-100000 $h^{-1}$, more preferably 1000-50000 $h^{-1}$; and a volume ratio of $H_2$ to CO of 0.8-3.6, preferably 1.5-2.5, more preferably 1.8-2.2. In the contacting, an inert gas may optionally be introduced as a diluent gas, such as nitrogen, in a content of 0-50% by volume in the mixed gas.

EXAMPLES

The following describes the present disclosure in detail with reference to the examples.

In the following examples, the BET pore volume was measured according to the method clarified in RIPP 151-190;

The water absorption rate was the water absorption rate after wiping off which was obtained by impregnating the dry support in deionized water at room temperature (20-25° C.) for 60 minutes, wiping off with filter papers after filtration, and then obtaining the mass of the support after water absorption, wherein the ratio of the difference between the obtained mass and the mass of the support before water absorption to the mass of the support before water absorption was used as the water absorption rate after wiping off;

The radial crushing strength of the support was measured on a QCY-602 crushing strength tester (manufactured by the Soda Research Institute of the Ministry of Chemical Industry) according to the method clarified in GB3635-1983;

The bulk density of the catalyst was determined according to the method clarified in Industrial Catalyst Analysis, Testing and Characterization, Edited by Liu Xiyao, China Petrochemical Press, Beijing, p29, April 1990. In particular, in the present disclosure, the bulk density of the catalyst was determined by a method comprising: crushing the catalyst, sieving out particles of 16-20 mesh, adding the sieved particles into a 500 mL measuring cylinder, and obtaining the weight G and the visual volume V, wherein the bulk density of the catalyst=G/V.

In the following preparation examples, examples and comparative examples, the pressure was a gauge pressure, and the amounts on dry basis were determined after calcining the sample at 600° C. for 4 hours.

Part I: With Respect to the Supported Catalysts Used as Hydrogenation Catalysts

Preparation Example 1

(1) 200.0 g of dried powder of alumina sol (from Sinopec Catalyst Ltd. Co, Changling Company, 68 wt % on dry basis, pseudo-boehmite as main ingredient, the same below), 19.2 g of HY molecular sieve (from Sinopec Catalyst Ltd. Co, Changling Company, 79 wt % on dry basis, FAU molecular sieve, the same below), and 8 g of sesban powder were mixed uniformly to obtain a mixed powder. To 10 mL of egg white (from fresh eggs) and 1 g of hydroxymethyl cellulose, water was added to 175 mL. The mixture was subjected to foaming in a foaming machine, and mixed with the mixed powder to obtain a mixture.

(2) The above mixture was fed into an extruder, kneaded for 3 times (each for 15 minutes), and extruded into strips through a three-lobe orifice plate in a size of Φ1.6 mm with cores, wherein the orifice plate was provided with three shaping rods (which were three cylinders with a diameter of 0.1 mm). The extruded strips was dried at 120° C. for 3 hours, and then calcined at 600° C. under air for 3 hours. Obtained was the catalyst support SA.

Figure 4:
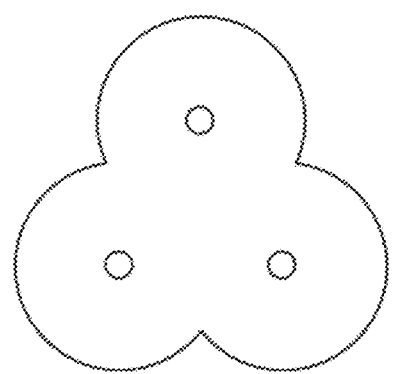
FIG. 4 is a schematic view showing the cross-section of the support SA of Example 1 in accordance with the present disclosure.

The support was in the shape of a three-lobe strip, wherein the diameter of the circumscribed circle of the cross-section was 1.6 mm, and the support included three internal channels penetrating the support (which were three cylinders with a diameter of 0.1 mm), wherein the three channels in cylinder shape respectively extended along the central axis of the circumscribed circle of each of the three lobes. The cross-section of the support was schematically shown in FIG. 4, and the strength of the support was listed in Table 1.

Figure 5:
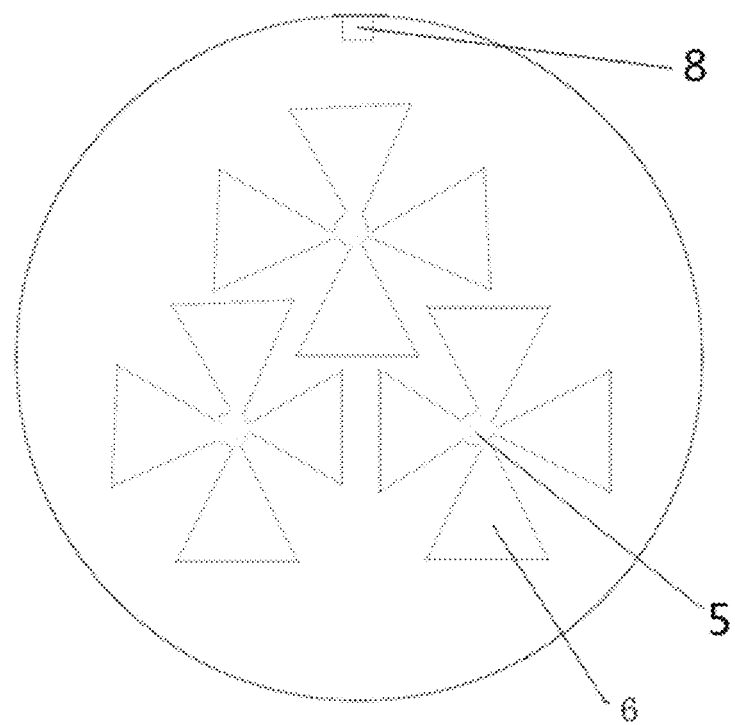
FIG. 5 is a schematic view showing the structure of the bracket of the orifice plate in accordance with one embodiment of the present disclosure.

The shaping was specially operated as described in the above detailed description. In particular, the shaping was performed with an orifice plate which comprised a bracket 3 with twelve feed holes 6, wherein the orifice plate was provided with three shaping rods 4. As shown in FIG. 5, each four feed holes 6 were circumferentially arranged at equal intervals along one of the shaping rods 4. The bracket 3 was further provided with three mounting holes 5 allowing the shaping rods 4 pass through. The three shaping rods 4 respectively extended along the central axis of the circumscribed circle of each of the three lobes, as shown in FIG. 5.

Preparation Comparative Example 1

(1) 200.0 g of dried powder of alumina sol, 19.2 g of HY molecular sieve and 8 g of sesban powder were mixed uniformly to obtain a mixed powder. To 2.5 mL of nitric acid with a weight concentration of 68%, water was added to 155 mL and mixed uniformly. The solution was added to the mixed powder to obtain a mixture. The mixture was fed into the extruder, kneaded for 3 times (each for 15 minutes), and extruded into strips through a three-lobe orifice plate in a size of Φ16 mm. The extruded strips was dried at 120° C. for 3 hours, and then calcined at 600° C. under air for 3 hours. Obtained was the support DA, which was solid (without an internal channel).

The support was in the shape of a three-lobed strip, wherein the diameter of the circumscribed circle of the cross-section was 1.6 mm. The cross-section of the support was schematically shown in FIG. 6.

Preparation Example 2

(1) 200.0 g of dried powder of alumina sol, 19.2 g of HY molecular sieve and 8 g of sesban powder were mixed uniformly to obtain a mixed powder. To 10 mL of animal protein based foaming agent (which was prepared by subjecting 20 g of cow hoofs, 6 g of Ca(OH)$_2$, 2 g of NaHSO$_3$ and 200 mL of water to hydrolyzing at a temperature of 80° c for a time of 6 h, to prepare the foaming agent in liquid, according to: Study of protein concrete foaming agent [J], Ma Zhijun, Li Xiaoyun, Ma Xuelei, Cui Yanling, Jia Yonghui, Building Science, 2009, 25 (05), p 73-76) (with an equivalent amount of 1.0 g cow hoofs) and 1 g of hydroxymethyl cellulose, water was added to 175 mL. The mixture was subjected to foaming in a foaming machine, and mixed with the mixed powder to obtain a mixture.

(2) The above mixture was fed into an extruder, kneaded for 3 times (each for 15 minutes), and extruded into strips through a four-lobe orifice plate in a size of Φ1.6 mm with cores, wherein the orifice plate was provided with four shaping rods (which were four cylinders with a diameter of 0.1 mm). The extruded strips was dried at 120° C. for 3 hours, and then calcined at 600° C. under air for 3 hours. Obtained was the support SB.

Figure 7:
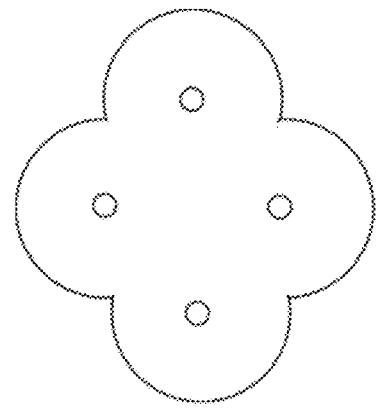
FIG. 7 is a schematic view showing the cross-section of the support SB of Example 2 in accordance with the present disclosure.

The support was in the shape of a four-lobe strip, wherein the diameter of the circumscribed circle of the cross-section was 1.6 mm, and the support included four internal channels penetrating the support (which were four cylinders with a diameter of 0.1 mm), wherein the four channels in cylinder shape respectively extended along the central axis of the circumscribed circle of each of the four lobes. The cross-section of the support was schematically shown in FIG. 7, and the strength of the support was listed in Table 1.

Preparation Example 3

Figure 8:
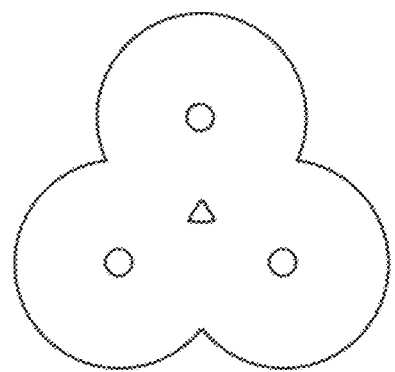
FIG. 8 is a schematic view showing the cross-section of the support SC of Example 3 in accordance with the present disclosure.

Preparation Example 1 was repeated except that egg white was in an amount of 5 mL and a three-lobe orifice plate in a size of Φ1.6 mm with cores was used for extruding strips. The support was in the shape of a three-lobe strip, wherein the diameter of the circumscribed circle of the cross-section was 1.6 mm, and the support included four internal channels penetrating the support (which were one regular triangular prism with a diameter of the circumscribed circle of 0.1 mm, and three cylinders with a diameter of 0.1 mm), wherein the channel in the shape of regular triangular prism extended along the central axis of the circumscribed circle of the three-lobe shape and the three channels in cylinder shape respectively extended along the central axis of the circumscribed circle of each of the three lobes. Obtained was the support SC. The cross-section of the support was shown in FIG. 8, and the strength of the support was listed in Table 1.

Preparation Example 4

Figure 9:
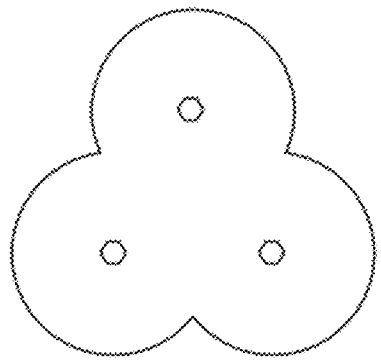
FIG. 9 is a schematic view showing the cross-section of the support SD of Example 4 in accordance with the present disclosure.

Preparation Example 2 was repeated except that the animal protein based foaming agent was in an amount of 20 mL and a three-lobe orifice plate in a size of Φ1.6 mm with cores was used for extruding strips. The support was in the shape of a three-lobe strip, wherein the diameter of the circumscribed circle of the cross-section was 1.6 mm, and the support included three internal channels penetrating the support (which were three regular hexagonal prism with a diameter of the circumscribed circle of 0.1 mm), wherein the three channels respectively extended along the central axis of the circumscribed circle of each of the three lobes. Obtained was the support SD. The cross-section of the support was shown in FIG. 9, and the strength of the support was listed in Table 1.

Preparation Example 5

Preparation Example 1 was repeated except that egg white was in an amount of 20 mL. Obtained was the support SE. The strength of the support was listed in Table 1.

Preparation Example 6

Preparation Example 1 was repeated except that egg white was replaced with a plant based foaming agent. In particular,
(1) 200.0 g of dried powder of alumina sol, 19.2 g of HY molecular sieve and 8 g of sesban powder were mixed uniformly to obtain a mixed powder. 1.5 g of tea saponin (from Xinyi FEIHUANG Chemical Co., Ltd.) and 0.5 mL of nitric acid with a wight concentration of 68% were mixed, to which water was added to 175 mL. The mixture was subjected to foaming in a foaming machine, and mixed with the mixed powder to obtain a mixture.

(2) The step (2) of Preparation Example 1 was repeated to extrude the mixture into strips. The extruded strips was dried at 120° C. for 3 hours, and then calcined at 600° C. under air for 3 hours. Obtained was the support SF. The strength of the support was listed in Table 1.

Preparation Example 7

Preparation Example 1 was repeated except that a three-lobe orifice plate in a size of Φ1.6 mm with cores was used for extruding strips, wherein the orifice plate was provided with one shaping rod (which was one cylinder with a diameter of 0.2 mm). Obtained was the support SG. The support was in the shape of a three-lobe strip, wherein the diameter of the circumscribed circle of the cross-section was 1.6 mm, and the support included one internal channel penetrating the support (which was a cylinder channel with a diameter of 0.2 mm), wherein the channel in cylinder shape extended along the central axis of the circumscribed circle of the three-lobe shape. The strength of the support was listed in Table 1.

The physicochemical properties of the above prepared supports were characterized. The results were listed in Table 1 below.

TABLE 1

| supports | examples | specific surface area, $m^2/g$ | pore volume, mL/g | water absorption rate, mL/g | the difference R, mL/g | the proportion, % | the strength, N/mm |
|---|---|---|---|---|---|---|---|
| DA | Comparative Preparation Example 1 | 244 | 0.533 | 0.643 | 0.110 | 17.1 | 24.7 |
| SA | Preparation Example 1 | 225 | 0.711 | 0.927 | 0.215 | 23.2 | 22.6 |
| SB | Preparation Example 2 | 216 | 0.792 | 1.060 | 0.268 | 25.3 | 21.8 |
| SC | Preparation Example 3 | 235 | 0.632 | 0.794 | 0.162 | 20.4 | 23.5 |
| SD | Preparation Example 4 | 188 | 1.031 | 1.460 | 0.429 | 29.4 | 19.2 |
| SE | Preparation Example 5 | 206 | 0.871 | 1.193 | 0.322 | 27.0 | 20.9 |
| SF | Preparation Example 6 | 196 | 0.941 | 1.323 | 0.382 | 28.9 | 20.4 |
| SG | Preparation Example 7 | 225 | 0.696 | 0.911 | 0.215 | 23.6 | 23.0 |

Note: The proportion refers to the ratio of the difference R to the water absorption rate of the support; the strength refers to the radial crushing strength of the support.

Examples 1-7 and Comparative Example 1

Those examples were used to illustrate the catalytic performance of the catalysts of the present disclosure.

The above-mentioned supports were measured for the water absorption rate. Corresponding to tungsten oxide in an amount of 21.5 wt % and nickel oxide in an amount of 2.5 wt % in catalysts, an aqueous solution of nickel nitrate (analytical grade, from Beijing Yili Chemical Reagent Factory) and ammonium metatungstate (industrial product, from Sinopec Catalyst Ltd. Co, Changling Company) was prepared. The supports of the Preparation Examples and the Comparative Preparation Example were impregnated with the aqueous solution via the pore saturation method. The impregnated supports were dried at 120° C. for 5 hours and then calcined at 400° C. for 3 hours, to obtain catalysts CSA to CSG and CDA, respectively. The bulk density of each catalyst was measured and the results were listed in Table 2.

A process was performed in one run, wherein the raw material oil was Maoming VGO (2011) with properties of: density (at 20° C.) of 0.9122 g/cm$^3$, $T_{IBP}$=272° C.; $T_{50}$%=422° C.; $T_{FBP}$=536° C.

Each catalyst was broken into particles with a length of 3-5 mm. 100 g of the catalyst was loaded into a 200 ml fixed-bed reactor with the remaining space filled with ceramic balls. Before passing the raw material oil, the catalyst was gas-phase vulcanized for 28 hours at a hydrogen partial pressure of 15.0 MPa, a temperature of 300° C., and DMDS as a vulcanizing agent. Then, the raw material oil was passed at a hydrogen partial pressure of 14.7 MPa, a temperature of 320° C., a hydrogen-to-oil ratio of 1200 vol/vol, and a volumetric space velocity of 0.85 h$^{-1}$. After 400 hours of reaction, samples were taken.

The catalysts were detected for the catalytic activity, the yield of jet fuels (with a distillation range of 160-250° C.) and the temperature for 95% of remained oil. The results were listed in Table 2.

Activity referred to the cracking reaction temperature at which the conversion rate to hydrocarbon oils with a distillation temperature higher than 350° C. was 60%. The lower cracking reaction temperature indicated the higher catalytic activity of the catalysts.

The temperature for 95% of remained oil referred to the distillation temperature at the distillation point of 95% in the simulated distillation curve.

Example 8

Example 1 was repeated except that, corresponding to molybdenum oxide in an amount of 16.3 wt %, nickel oxide in an amount of 2.8 wt % and phosphorus in an amount of 1.1 wt % in the catalyst, an aqueous solution of ammonium molybdate, nickel bicarbonate and phosphoric acid was prepared. Obtain was the catalyst CSH. The performance data of the catalyst are listed in Table 2.

Example 9

Example 1 was repeated except that, corresponding to tungsten oxide in an amount of 17.0 wt % and nickel oxide in an amount of 3.0 wt % in the catalyst, an aqueous solution of ammonium metatungstate and nickel nitrate was prepared. Obtain was the catalyst CSI. The performance data of the catalyst were listed in Table 2.

TABLE 2

| catalysts | activity, ° C. | yield of jet fuels, % | the temperature for 95% of remained oil, ° C. | bulk density of the catalyst, (g/mL) |
|---|---|---|---|---|
| Compative Example 1 | CDA | 377.6 | 37.9 | 495.5 | 0.96 |
| Example 1 | CSA | 379.1 | 38.7 | 491.2 | 0.84 |
| Example 2 | CSB | 379.8 | 39.0 | 489.0 | 0.79 |
| Example 3 | CSC | 378.4 | 38.3 | 493.4 | 0.89 |
| Example 4 | CSD | 381.9 | 39.6 | 482.4 | 0.62 |
| Example 5 | CSE | 380.5 | 39.2 | 486.8 | 0.73 |
| Example 6 | CSF | 381.2 | 39.5 | 484.3 | 0.68 |
| Example 7 | CSG | 379.0 | 38.7 | 491.2 | 0.85 |
| Example 8 | CSH | 381.6 | 38.3 | 493.2 | 0.83 |
| Example 9 | CSI | 380.1 | 38.5 | 492.7 | 0.85 |

As could be seen from the data in Table 2, the catalyst of the present disclosure had the advantages of high activity, high yield of jet fuels and low bulk density.

Part II: With Respect to the Supported Catalysts Used as Fischer-Tropsch Synthesis Catalysts Example 10

This example was used to illustrate the preparation of the support and catalyst of the present disclosure (1) The Preparation of the Support S1: 200.0 g of dried powder of alumina sol (from Sinopec Catalyst Ltd. Co, Changling Company, 68 wt % on dry basis) and 6 g of sesban powder were mixed uniformly to obtain a mixed powder. To 2.5 mL of nitric acid, water was added to 155 mL, mixed uniformly. The solution was added to the mixed powder to obtain a mixture.

Figure 10:
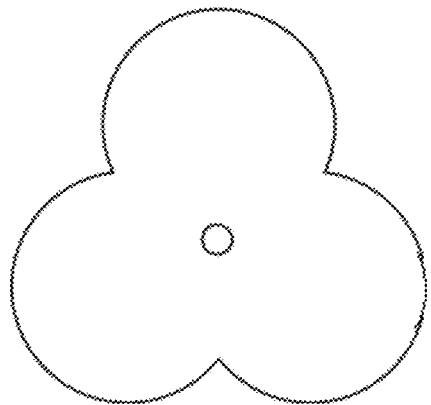
FIG. 10 is a schematic view showing the cross-section of the support ZA of Example 10 in accordance with the present disclosure.

S2: The above mixture was kneaded in an extruder for 3 times and extruded into strips through a three-lobe orifice plate in a size of Φ1.6 mm with cores. The extruded strips were dried at 120° C. for 3 hours, and then calcined at 600° C. under air for 3 hours. Obtained was the catalyst support ZA. The support was in the shape of a three-lobe strip, wherein the diameter of the circumscribed circle of the cross-section was 1.6 mm, and the support included an internal channel penetrating the support (which was cylinder with a diameter of 0.1 mm), wherein the channel extended along the central axis of the circumscribed circle. The cross-section of the catalyst support ZA was shown in FIG. 10, and the radial crushing strength thereof was listed in Table 3.

The shaping was specially operated as follow. The shaping was performed with an orifice plate which comprised a base 1 with a shaping hole 2 (as shown in FIG. 1, the shaping hole 2 was in the shape of a three-lobe, wherein the diameter of the circumscribed circle thereof was 1.6 mm), a bracket 3 with three feed holes 6, and one shaping rod 4. As shown in FIG. 2, the three feed holes 6 were circumferentially arranged at equal intervals along the shaping rod 4. As shown in FIGS. 1 and 2, the bracket 3 was arranged over the base 1. The base 1 and the bracket 3 were provided on the contacting surfaces with the first installation structure 7 and the second installation structure 8 respectively, which were matched to detachably connect the base 1 and the bracket 3.

The bracket 3 was further provided with a mounting hole 5 allowing the shaping rod 4 (in the shape as shown in FIG. 3) pass through. The shaping rod 4 was arranged to pass through the shaping hole 2. The shaping rod 4 extended along the central axis of the circumscribed circle of the three-lobe shape. The head 13 of the shaping rod 4 was installed in the mounting hole 5, and the rod portion 14 of the shaping rod extended towards the outlet of the shaping hole so as to be sleeved in (or penetrate) the mounting hole 5 and the shaping hole 2. The part of the shaping rod 4 located in the shaping hole was configured as a cylinder with a diameter of 0.1 mm.

(2) The Preparation of the Catalyst

Corresponding to cobalt oxide in an amount of 30 wt % in the catalyst, a solution of cobalt nitrate (analytical grade, from Beijing Yili Chemical Reagent Factory) was prepared. The support ZA was impregnated twice with the solution of cobalt nitrate via the pore saturation method. After each impregnation, the impregnated support was dried at 120° C. for 3 hours and then calcined at 400° C. for 3 hours. Obtain was the catalyst ZAC.

Example 11

Figure 11:
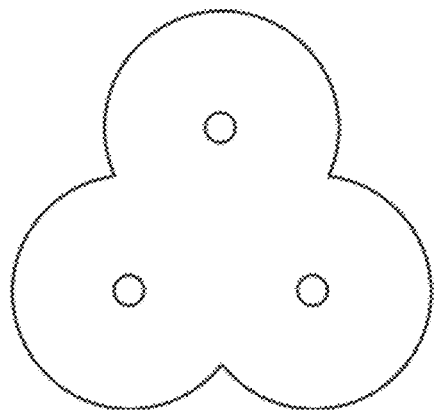
FIG. 11 is a schematic view showing the cross-section of the support ZB of Example 11 in accordance with the present disclosure.

This example was used to illustrate the preparation of the support and catalyst of the present disclosure (1) The Preparation of the Support Example 10 was repeated except that a three-lobe orifice plate in a size of Φ1.6 mm with cores was used to extrude strips, wherein the orifice plate was provided with three shaping rods. Obtained was the catalyst support ZB. The support was in the shape of a three-lobe strip, wherein the diameter of the circumscribed circle of the cross-section thereof was 1.6 mm, and the support included three internal channels penetrating the support (which were cylinders with a diameter of 0.1 mm), wherein the three channels extended respectively along the central axis of the circumscribed circle of each of the three lobes. The cross-section of the catalyst support ZB was shown in FIG. 11, and the radial crushing strength thereof was listed in Table 3.

Figure 6:
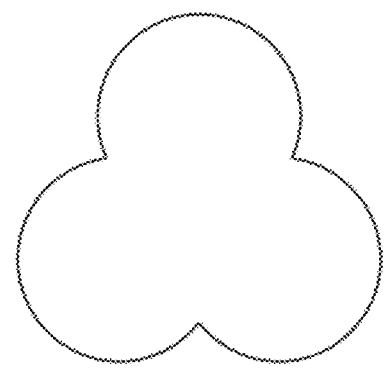
FIG. 6 is a schematic view showing the cross-section of the support DA of Comparative Example 1.

The shaping of Example 10 was repeated except that the bracket 3 was provided with twelve feed holes 6 and the orifice plate was provided with three shaping rods 4. As shown in FIG. 6, each four of the feed holes 6 were circumferentially arranged at equal intervals along one of the shaping rods 4. The bracket 3 was further provided with three mounting holes 5 allowing the shaping rods 4 pass through. The three shaping rods 4 respectively extended along the central axis of the circumscribed circle of each of the three lobes.

(2) The Preparation of the Catalyst

The preparation of the catalyst outlined in Example 10 was repeated except that the support ZA was replaced with the catalyst support ZB. Obtain was the catalysts ZBC.

Example 12

Figure 12:
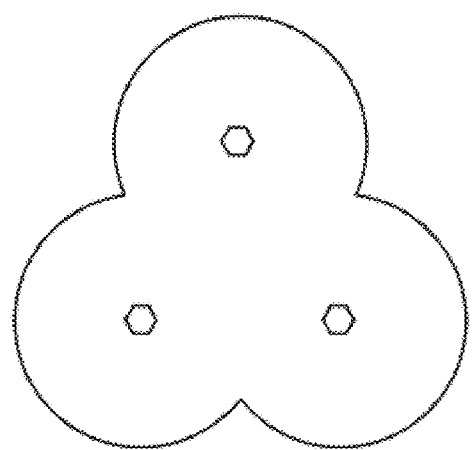
FIG. 12 is a schematic view showing the cross-section of the support ZC of Example 12 in accordance with the present disclosure.

This example was used to illustrate the preparation of the support and catalyst of the present disclosure (1) The Preparation of the Support Example 11 was repeated except that a three-lobe orifice plate in a size of Φ1.6 mm with cores was used to extrude strips, wherein the orifice plate was provided with three shaping rods. Obtained was the catalyst support ZC. The support was in the shape of a three-lobe strip, wherein the diameter of the circumscribed circle of the cross-section thereof was 1.6 mm, and the support included three internal channels penetrating the support (which were regular hexagonal prisms with a diameter of the circumscribed circle of 0.1 mm), wherein the three channels extended respectively along the central axis of the circumscribed circle of each of the three lobes. The cross-section of the catalyst support ZC was shown in FIG. 12, and the radial crushing strength of the catalyst support ZC was listed in Table 3.

The shaping of Example 11 was repeated except that the three shaping rods 4 were all in the shape of a regular hexagonal prism with a diameter of the circumscribed circle of 0.1 mm.

(2) The Preparation of the Catalyst

The preparation of the catalyst outlined in Example 10 was repeated except that the support ZA was replaced with the catalyst support ZC. Obtain was the catalyst ZCC.

Example 13

Figure 13:
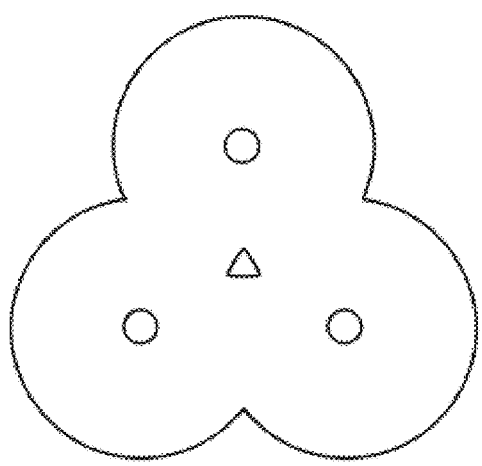
FIG. 13 is a schematic view showing the cross-section of the support ZD of Example 13 in accordance with the present disclosure.

This example was used to illustrate the preparation of the support and catalyst of the present disclosure (1) The Preparation of the Support Example 11 was repeated except that a three-lobe orifice plate in a size of Φ1.6 mm with cores was used to extrude strips, wherein the orifice plate was provided with four shaping rods (which were one regular triangular prism with a diameter of the circumscribed circle of 0.1 mm, and three cylinders with a diameter of 0.1 mm). Obtained was the catalyst support ZD. The support was in the shape of a three-lobe strip, wherein the diameter of the circumscribed circle of the cross-section thereof was 1.6 mm, and the support included four internal channels penetrating the support (which were one regular triangular prism with a diameter of the circumscribed circle of 0.1 mm, and three cylinders with a diameter of 0.1 mm), wherein the channel in the shape of regular triangular prism extended along the central axis of the circumscribed circle of the three-lobe shape and the three channels in cylinder shape respectively extended along the central axis of the circumscribed circle of each of the three lobes. The cross-section of the catalyst support ZD was shown in FIG. 13, and the radial crushing strength of the catalyst support ZD was listed in Table 3.

(2) The Preparation of the Catalyst

The preparation of the catalyst outlined in Example 10 was repeated with the catalyst support ZD. Obtain was the catalysts ZDC.

Example 14

Figure 14:
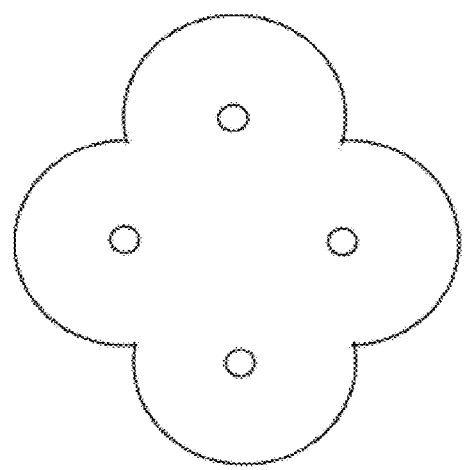
FIG. 14 is a schematic view showing the cross-section of the support ZE of Example 14 in accordance with the present disclosure.

This example was used to illustrate the preparation of the support and catalyst of the present disclosure (1) The Preparation of the Support Example 11 was repeated except that a four-lobe orifice plate in a size of Φ1.6 mm with cores was used to extrude strips, wherein the orifice plate was provided with four shaping rods (which were four cylinders with a diameter of 0.1 mm). Obtained was the catalyst support ZE. The support was in the shape of a four-lobe strip, wherein the diameter of the circumscribed circle of the cross-section thereof was 1.6 mm, and the support included four internal channels penetrating the support (which were four cylinders with a diameter of 0.1 mm), wherein the four channels in cylinder shape respectively extended along the central axis of the circumscribed circle of each of the four lobes. The cross-section of the catalyst support ZE was shown in FIG. 14, and the radial crushing strength of the catalyst support ZE was listed in Table 3.

(2) The Preparation of the Catalyst

The preparation of the catalyst outlined in Example 10 was repeated with the catalyst support ZE. Obtain was the catalyst ZEC.

Example 15

Figure 15:
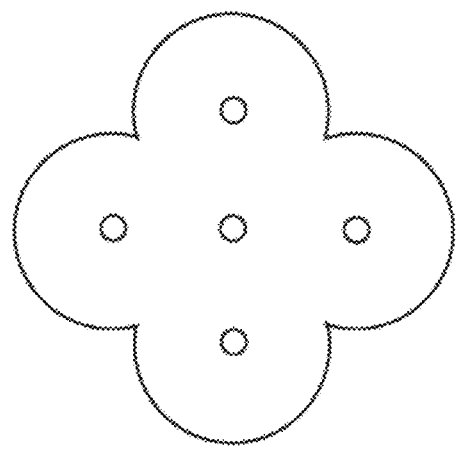
FIG. 15 is a schematic view showing the cross-section of the support ZF of Example 15 in accordance with the present disclosure.

This example was used to illustrate the preparation of the support and catalyst of the present disclosure (1) The Preparation of the Support Example 11 was repeated except that a four-lobe orifice plate in a size of Φ1.6 mm with cores was used to extrude strips, wherein the orifice plate was provided with five shaping rods (which were five cylinders with a diameter of 0.1 mm). Obtained was the catalyst support ZF. The support was in the shape of a four-lobe strip, wherein the diameter of the circumscribed circle of the cross-section thereof was 1.6 mm, and the support included five internal channels penetrating the support (which were five cylinders with a diameter of 0.1 mm), wherein one channel in cylinder shape extended along the central axis of the circumscribed circle of the four-lobe shape and the other four channels in cylinder shape respectively extended along the central axis of the circumscribed circle of each of the four lobes. The cross-section of the catalyst support ZF was shown in FIG. 15, and the radial crushing strength of the catalyst support ZF was listed in Table 3.

(2) The Preparation of the Catalyst

The preparation of the catalyst outlined in Example 10 was repeated with the catalyst support ZF. Obtain was the catalyst ZFC.

Example 16

Example 10 was repeated except that a three-lobe orifice plate in a size of Φ1.6 mm with cores was used to extrude strips, wherein the orifice plate was provided with one shaping rod (which was a cylinder with a diameter of 0.2 mm). Obtained was the catalyst support ZG. The support was in the shape of a three-lobe strip, wherein the diameter of the circumscribed circle of the cross-section thereof was 1.6 mm, and the support included one internal channel penetrating the support (which was a channel in cylinder shape with a diameter of 0.2 mm), wherein the channel in cylinder shape extended along the central axis of the circumscribed circle of the three-lobe shape. The radial crushing strength of the catalyst support ZG was listed in Table 3.

(2) The Preparation of the Catalyst

The preparation of the catalyst outlined in Example 10 was repeated with the catalyst support ZG. Obtain was the catalyst ZGC.

Example 17

(1) The step (1) of Example 10 was repeated to prepare the support ZA.

(2) The preparation of the catalyst

Corresponding to Ru in an amount of 0.3 wt % and cobalt oxide in an amount of 35 wt % in the catalyst, a solution of ruthenium chloride and cobalt nitrate was prepared. The support ZA was impregnated twice with the solution of ruthenium chloride and cobalt nitrate via the pore saturation method. After each impregnation, the impregnated support was dried at 120° C. for 3 hours and then calcined at 400° C. for 3 hours. Obtain was the catalyst ZHC.

Example 17

(1) The step (1) of Example 10 was repeated to prepare the support ZA.

(2) The preparation of the catalyst

Corresponding to Ru in an amount of 0.2 wt %, cobalt oxide in an amount of 25 wt % and magnesium oxide in an amount of 5 wt % in the catalyst, a solution of ruthenium chloride, cobalt nitrate and magnesium chloride was prepared. The support ZA was impregnated twice with the solution of ruthenium chloride, cobalt nitrate and magnesium chloride via the pore saturation method. After each impregnation, the impregnated support was dried at 120° C. for 3 hours and then calcined at 400° C. for 3 hours. Obtain was the catalyst ZIC.

Comparative Example 2

This comparative example was used to illustrate the preparation of the comparative support and catalyst.

(1) The Preparation of the Support

Figure 16:
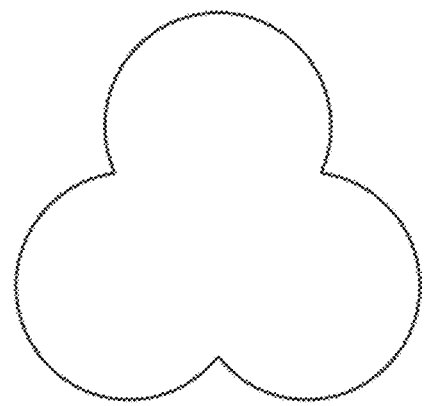
FIG. 16 is a schematic view showing the cross-section of the support DA-2 of Comparative Example 2.

Example 10 was repeated except that a traditional orifice plate was used in the shaping. Obtained was the catalyst support DA-2 in solid shape (without an internal channel). The catalyst support DA-2 was in the shape of a three-lobe strip, wherein the diameter of the circumscribed circle of the cross-section thereof was 1.6 mm. The cross-section of the catalyst support DA-2 was shown in FIG. 16, and the radial crushing strength of the catalyst support DA-2 was listed in Table 3.

(2) The Preparation of the Comparative Catalyst

The preparation of the catalyst outlined in Example 10 was repeated with the catalyst support DA-2. Obtain was the comparative catalyst DAC-2.

Test Examples

The test examples were used to illustrate the performance of the catalysts obtained above in a Fischer-Tropsch synthesis reaction.

(1) Activation of the Catalysts 5 mL of each of the above-prepared catalysts was filled in a fixed-bed micro-reactor with the remaining space filled with quartz sands. The catalyst was firstly reduced and activated with hydrogen for 5 hours under the conditions of a pressure of 0.1 MPa, a space velocity of 1000 $h^{-1}$ and a temperature of 400° C.

(2) Evaluation of the Catalyst with Respect to Activity in Fischer-Tropsch Synthesis The Fischer-Tropsch synthesis reaction was performed in one run under the conditions of a temperature of 210° C., a pressure of 2.5 MPa, a space velocity of a synthesis gas of 2000 $h^{-1}$ and a synthesis gas with a volume composition of $H_2/CO/N_2=60/30/10$. After 8 hours of reaction, gases were sampled online for calculations.

The activity of the catalyst was characterized by the conversion of CO, and the selectivity of the Fischer-Tropsch synthesis catalyst was characterized by the selectivity to methane and C5+ hydrocarbons. The results were listed in Table 4.

TABLE 3

| examples | supports | the radial crushing strength (N/mm) |
|---|---|---|
| Example 10 | ZA | 25.9 |
| Example 11 | ZB | 23.8 |
| Example 12 | ZC | 24.2 |
| Example 13 | ZD | 22.9 |
| Example 14 | ZE | 23.2 |
| Example 15 | ZF | 23.7 |
| Example 16 | ZG | 24.5 |
| Comparative Example 2 | DA-2 | 26.7 |

TABLE 4

| Number | catalysts | the conversion of CO, % | selectivity to methane, % | selectivity to C5+ hydrocarbons, % |
|---|---|---|---|---|
| Example 10 | ZAC | 45.2 | 9.48 | 82.1 |
| Example 11 | ZBC | 47.6 | 7.62 | 83.5 |
| Example 12 | ZCC | 48.7 | 7.02 | 84.2 |
| Example 13 | ZDC | 53.5 | 6.12 | 86.9 |
| Example 14 | ZEC | 51.0 | 6.82 | 85.2 |
| Example 15 | ZFC | 52.4 | 6.45 | 86.1 |
| Example 16 | ZGC | 49.3 | 7.12 | 84.3 |
| Example 17 | ZHC | 67.6 | 6.56 | 85.1 |
| Example 18 | ZIC | 58.5 | 6.72 | 83.9 |
| Comparative Example 2 | DAC-2 | 37.6 | 13.3 | 76.4 |

As could be seen from the results in Table 4, compared with Comparative Example 2, the catalysts of the present disclosure had significantly higher activity in Fischer-Tropsch synthesis and selectivity to C5+ hydrocarbons, and had lower selectivity to methane.

Part III: With respect to the effects of the diameter of the channel incorporated in a support on the radial crushing strength of the support Example 10 was repeated except that a circle orifice plate in a size of Ø1.6 mm with cores was used to extrude strips, wherein the orifice plate was provided with one shaping rod. The shaping rod was configured as a cylinder with a diameter of 0, 0.1 mm, 0.2 mm, 0.3 mm, 0.5 mm, 0.7 mm and 1 mm, respectively. Obtained were a series of catalyst supports Z0-Z6. The supports Z0-Z6 were all in cylinder shape, wherein the diameter of the cross-section thereof was 1.6 mm, and the supports included one internal channel penetrating the support (which was a channel in cylinder shape with a diameter of 0, 0.1 mm, 0.2 mm, 0.3 mm, 0.5 mm, 0.7 mm and 1 mm, respectively), wherein the channel extended along the central axis of the cylinder shape. The radial crushing strength of the catalyst supports Z0-Z6 was tested, and the pressure applied to the tested catalyst supports was recorded when a radial deformation of about 0.17 mm occurred. It had been observed that, crushing occurred when the deformation of the tested catalyst supports exceeded about 0.17 mm. Therefore, the pressure applied to the catalyst supports at that moment was recorded as crushing pressure. When comparing the data of the supports with an internal channel penetrating the supports with the data of the supports without the channel, i.e. comparing the measured crushing pressure for each of Z1-Z6 with the measured crushing pressure for Z0, obtained ratio was the retention of crushing strength. The test results were listed in Table 5.

TABLE 5

| catalysts | diameter of the channel, mm | diameter of the support, mm | ratio of cross-section area of the channel to that of the support, % | retention of crushing strength, % |
|---|---|---|---|---|
| Z0 | 0 | 1.6 | 0.00 | 100.0 |
| Z1 | 0.1 | 1.6 | 0.39 | 97.8 |
| Z2 | 0.2 | 1.6 | 1.56 | 93.8 |
| Z3 | 0.3 | 1.6 | 3.52 | 86.7 |
| Z4 | 0.5 | 1.6 | 9.77 | 70.2 |
| Z5 | 0.7 | 1.6 | 19.14 | 37.7 |
| Z6 | 1 | 1.6 | 39.06 | 12.4 |

Figure 17:
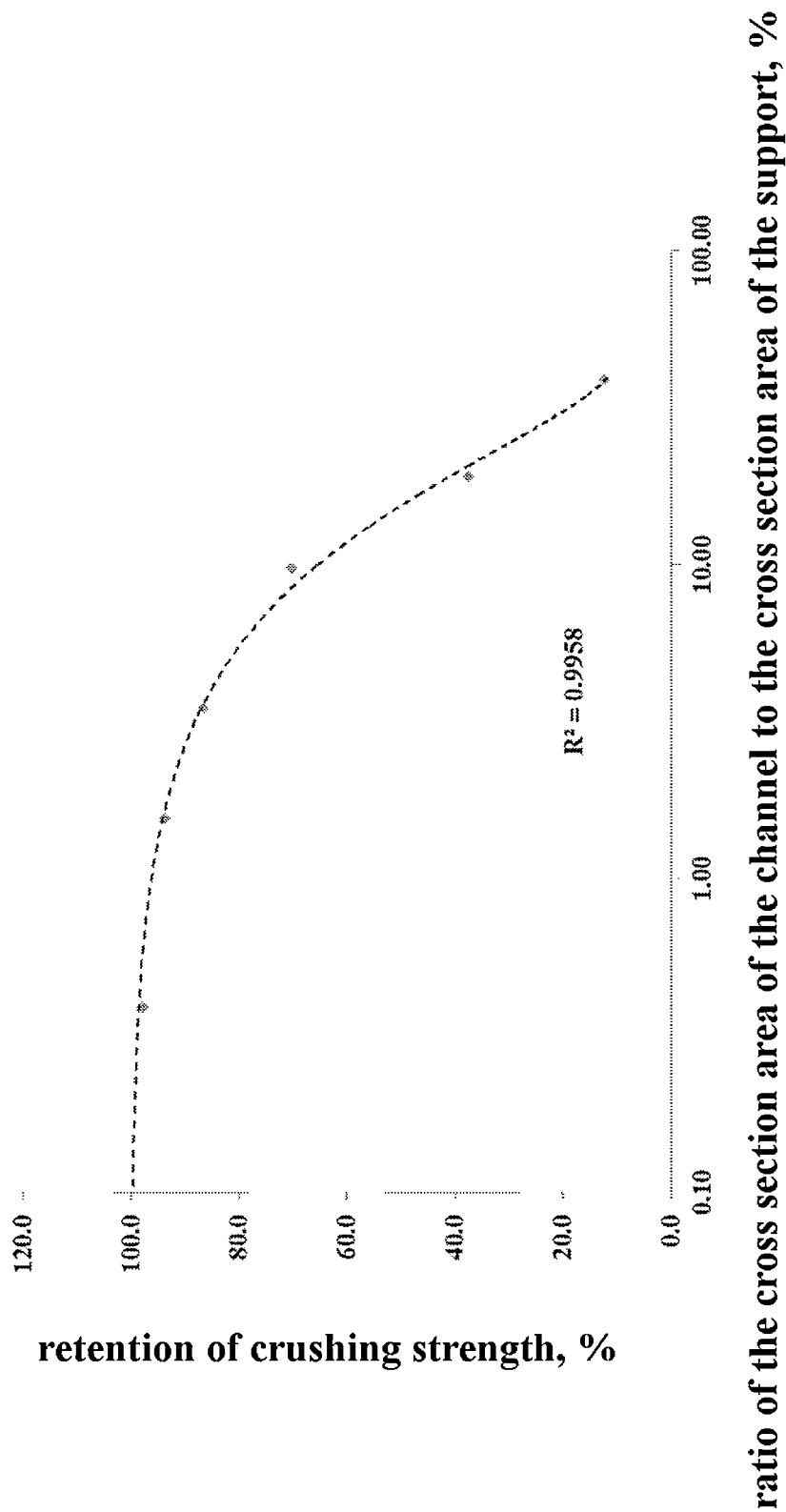
FIG. 17 is a graph showing the relationship between the channel size and the radial crushing strength of the support.

A profile was plotted by taking the above data, shown in FIG. 17. As could be seen from the above results, when the ratio of the cross-section area of the channel to the cross-section area of the support was less than or equal to 3:100, the drop in the strength of the support was less than about 10%.

The results of the foregoing examples suggested that, by controlling the ratio of the cross-section area of the channel to the cross-section area of the support in a range of less than or equal to 3:100, the corresponding supported catalysts might have both high strength and high catalytic activity. The obtained catalysts might be suitable for use in fixed bed reactors, especially in microreactors, microchannel reactors, microchemical reactors or mesoscopic reactors.

The preferred embodiments of the present disclosure have been described in detail above, but the present disclosure is not limited thereto. Within the scope of the technical concept of the present disclosure, a variety of simple modifications can be made to the technical solution of the present disclosure, including the combination of various technical features in any other suitable manner. These simple modifications and combinations should also be regarded as the disclosed content of the present disclosure. All belong to the protection scope of the present disclosure.

The invention claimed is:

1. A supported catalyst, comprising a support and a metal active component disposed on the support,
    wherein the metal active component is at least one selected from the group consisting of a Group VIB metal element and a Group VIII metal element;
    wherein the support is made of a material comprising at least one of heat-resistant inorganic oxides and molecular sieves;
    wherein the support is shaped into a base having at least one channel extending through the base, wherein a ratio of a cross-sectional area of all of the at least one channel to a cross-sectional area of the support is 0.05-3:100;
    wherein a difference between a water absorption rate of the support and a BET pore volume of the support is not less than 0.2 mL/g; and
    wherein the number of the at least one channel is 1-10.

2. The supported catalyst of claim 1, wherein the Group VIB metal element is Mo and/or W, and the Group VIII metal element is Co and/or Ni, and
    wherein, based on the total amount of the catalyst, the Group VIB metal element is present in an amount of 10-35 wt %; the Group VIII metal element is present in an amount of 2-15 wt %; and the support is present in an amount of 50-88 wt %, all on oxide basis.

3. The supported catalyst of claim 1, wherein the heat-resistant inorganic oxide is at least one selected from the group consisting of alumina, silica, titania, magnesium oxide, zirconia, thorium oxide and beryllium oxide;

the molecular sieve comprises at least one selected from the group consisting of ten-membered ring silica-alumina molecular sieve, twelve-membered ring silica-alumina molecular sieve, fourteen-membered ring silica-alumina molecular sieve and eighteen-membered ring silica-alumina molecular sieve; and based on the total amount of the support, the heat-resistant inorganic oxide is present in an amount of 1-99 wt % and the molecular sieve is present in an amount of 1-99 wt %.

4. The supported catalyst of claim 3, wherein the heat-resistant inorganic oxide is at least one of alumina, silica, titania and zirconia;

the molecular sieve comprises at least one selected from the group consisting of ZRP molecular sieve, Y molecular sieve, beta molecular sieve, mordenite, ZSM-5 molecular sieve, MCM-41 molecular sieve, Ω molecular sieve, ZSM-12 molecular sieve and MCM-22 molecular sieve.

5. The supported catalyst of claim 1, wherein the metal active component is at least one of Group VIII metal elements.

6. The supported catalyst of claim 5, which further includes a first metal promoter supported on the support, wherein the first metal promoter is at least one selected from transition metals.

7. The supported catalyst of claim 6, wherein the first metal promoter is at least one selected from the group consisting of Cu, Ru, Rh, Re, Pd and Pt.

8. The supported catalyst of claim 5, wherein the metal active component is Co; and wherein, based on the total amount of the catalyst, Co is present in an amount of 5-80 wt %, on oxide basis; and based on the total amount of the catalyst, the first metal promoter is present in an amount of 0-40 wt %.

9. The supported catalyst of claim 5, which further contains a second metal promoter supported on the support, wherein the second metal promoter is at least one selected from the group consisting of alkali metals and alkaline earth metals based on the total amount of the catalyst, the second metal promoter is present in an amount of 0-20 wt %, on oxide basis.

10. The supported catalyst of claim 9, wherein the second metal promoter is at least one of Na, K, Mg and Ca;

based on the total amount of the catalyst, the second metal promoter is present in an amount of 1-20 wt %, on oxide basis.

11. The supported catalyst of claim 5, wherein the metal active component is at least one of Ni, Fe and Co.

12. The supported catalyst of claim 1, wherein the support is in the shape of spheres and/or strips, or the support has an equivalent diameter of not more than 5 mm, or each channel is a passage of an uniform cross-section.

13. The supported catalyst of claim 1, wherein the support has a radial crushing strength of 14-30 N/mm.

14. The supported catalyst of claim 1, wherein the number of the at least one channel is 1-10, or the cross-section of the support is a circle, and one channel extend along the central axis of the support in the shape of cylinder and/or the channels are circumferentially arranged at equal intervals in parallel with the central axis.

15. The supported catalyst of claim 1, wherein the support is in the shape of multi-lobe strips; or the support has an equivalent diameter of 0.8-2 mm; or the channel is in the shape of a cylinder and/or a regular polygonal prism; wherein the diameter of the cylinder and the diameter of the circumscribed circle of the regular polygonal prism are independently 0.01-0.5 mm.

16. The supported catalyst of claim 1, wherein the number of the at least one channel is 1-6; or the cross-section of the support is in a multi-lobe shape, the channels extend along the central axis of the circumscribed cylinder of the multi-lobe shape and/or extend along the central axis of the circumscribed cylinder of each of the lobes.

17. A method for preparing a supported catalyst wherein the supported catalyst comprises a support and a metal active component disposed on the support, the metal active component is at least one selected from the group consisting of a Group VIB metal element and a Group VIII metal element, the support is made of a material comprising at least one of heat-resistant inorganic oxides and molecular sieves and is shaped into a base having at least one channel extending through the base, wherein a ratio of a cross-sectional area of all of the at least one channel to a cross-sectional area of the support is 0.05-3:100, a difference between a water absorption rate of the support and a BET pore volume of the support is not less than 0.2 mL/g, and the number of the at least one channel is 1-10 comprising the steps of:

(I) mixing precursors of the support, water, optionally a foaming agent, optionally an extrusion aid and optionally a binder, to obtain a mixture;

(II) shaping the mixture to obtain a shaped product with an internal channel penetrating the shaped product;

(III) subjecting the shaped product obtained in step (II) to the first calcining to obtain the support; and (IV) impregnating the support obtained in step (III) with a solution containing precursors of the metal active component, and then subjecting to drying and the second calcining.

18. The method of claim 17, wherein the foaming agent is an animal protein based foaming agent and/or a plant based foaming agent;

wherein the extrusion aid is at least one selected from the group consisting of sesban powder, cellulose and derivatives thereof, starch and derivatives thereof, ethylene glycol and diethylene glycol;

wherein the binder is at least one selected from the group consisting of hydroxymethyl cellulose, inorganic acids, starch and derivatives thereof, silica sol, and aluminum sol; and wherein relative to 100 g of the precursors of the support on a dry basis, the foaming agent is present in an amount of 0-50 mL relative to 100 g of the precursors of the support on a dry basis, the extrusion aid is present in an amount of 0.1-6 g; and relative to 100 g of the precursors of the support on a dry basis, the binder is present in an amount of 0.1-10 g.

19. The method of claim 17, wherein the first calcining is operated at a temperature of 350-700° C. for 1-10 h;

the drying is operated at a temperature of 80-300° C. for 0.5-24 h and the second calcining is operated at a temperature of 350-750° C. for 0.2-12 h.

20. The method of claim 17, wherein precursors of the metal active component are one or more selected from the group consisting of cobalt hydroxide, cobalt chloride, cobalt sulfate, cobalt nitrate, cobalt carbonate, cobalt bicarbonate, cobalt formate, cobalt acetate, cobalt oxalate and cobalt naphthenate.

21. A use of the supported catalyst of claim 1 in hydrocracking.

22. A hydrocracking method, comprising the step of: contacting a hydrocarbon oil with a hydrocracking catalyst under hydrocracking conditions, wherein the hydrocracking catalyst is the supported catalyst of claim 1.

23. A use of the supported catalyst of claim 5 in a Fischer-Tropsch synthesis reaction.

24. A Fischer-Tropsch synthesis method, comprising the steps of: contacting CO and H2 with a catalyst under the conditions for Fischer-Tropsch synthesis reaction, wherein the catalyst is the supported catalyst of claim 5.

* * * * *